(12) United States Patent
Chae

(10) Patent No.: US 10,760,899 B2
(45) Date of Patent: Sep. 1, 2020

(54) SHAPE DISCRIMINATION DEVICE, SHAPE DISCRIMINATION METHOD AND SHAPE DISCRIMINATION PROGRAM

(71) Applicant: Rakuten, Inc., Tokyo (JP)

(72) Inventor: Yeongnam Chae, Tokyo (JP)

(73) Assignee: Rakuten, Inc., Tokyo (JP)

( * ) Notice: Subject to any disclaimer, the term of this patent is extended or adjusted under 35 U.S.C. 154(b) by 168 days.

(21) Appl. No.: 16/062,376

(22) PCT Filed: Dec. 25, 2015

(86) PCT No.: PCT/JP2015/086270
§ 371 (c)(1),
(2) Date: Jun. 14, 2018

(87) PCT Pub. No.: WO2017/109946
PCT Pub. Date: Jun. 29, 2017

(65) Prior Publication Data
US 2019/0003827 A1    Jan. 3, 2019

(51) Int. Cl.
*G01B 11/24* (2006.01)
*G06K 9/00* (2006.01)
(Continued)

(52) U.S. Cl.
CPC ............... *G01B 11/24* (2013.01); *G06K 9/00* (2013.01); *G06K 9/4609* (2013.01); *G06T 7/564* (2017.01);
(Continued)

(58) Field of Classification Search
None
See application file for complete search history.

(56) References Cited

U.S. PATENT DOCUMENTS

| | | | | |
|---|---|---|---|---|
| 5,315,666 A | * | 5/1994 | Norton-Wayne | .... G01B 11/024 382/111 |
| 2009/0208109 A1 | * | 8/2009 | Kakinami | .............. B60Q 9/004 382/190 |

(Continued)

FOREIGN PATENT DOCUMENTS

| JP | 02110307 A | 4/1990 |
|---|---|---|
| JP | 2005319080 A | 11/2005 |

(Continued)

OTHER PUBLICATIONS

Zhong Li, Xiaogang Jin, Brian Barsky, and Jun Liu. "3D Clothing Fitting Based on the Geometric Feature Matching," In International Conference on Computer-Aided Design and Computer Graphics, Nov. 2009 (Year: 2009).*

(Continued)

*Primary Examiner* — Soo Shin
(74) *Attorney, Agent, or Firm* — Sughrue Mion, PLLC

(57) ABSTRACT

A shape discrimination device includes an approximate curve calculator configured to calculate an approximate curve of a contour, the contour being a line having a finite length representing a part of an outline of an object shown in an image, the approximate curve being a line approximating to the contour and calculated based on coordinates forming the contour, a distance calculator configured to calculate a first distance and a second distance being distances from a first and second end of the contour to a first and second end of the approximate curve, respectively, a coincidence calculator configured to calculate a center coincidence being a degree of coincidence between a center of the contour and the approximate curve, and a specifier configured to specify a shape of the object or a part of the object based on the first distance, the second distance, and the center coincidence.

11 Claims, 20 Drawing Sheets

(51) Int. Cl.
  *G06K 9/46*    (2006.01)
  *G06T 7/564*   (2017.01)
  *G06T 7/60*    (2017.01)
  *G06T 7/64*    (2017.01)

(52) U.S. Cl.
  CPC .................. *G06T 7/60* (2013.01); *G06T 7/64* (2017.01); *G06T 2207/30124* (2013.01)

(56) References Cited

U.S. PATENT DOCUMENTS

| | | | |
|---|---|---|---|
| 2012/0099799 A1* | 4/2012 | Fujiwara | G06T 7/12 382/203 |
| 2012/0259701 A1* | 10/2012 | Kumazawa | G06Q 30/0601 705/14.53 |
| 2017/0228400 A1 | 8/2017 | Kumazawa et al. | |

FOREIGN PATENT DOCUMENTS

| | | | |
|---|---|---|---|
| JP | 2007127610 A | 5/2007 |
| JP | 2012199832 A | 10/2012 |
| WO | 2011078174 A1 | 6/2011 |

OTHER PUBLICATIONS

International Preliminary Report on Patentability, dated Jul. 5, 2018, PCT/JP2015/086270.

International Search Report dated Feb. 2, 2016 from the International Bureau in counterpart International application No. PCT/JP2015/086270.

* cited by examiner

SHAPE DISCRIMINATION DEVICE, SHAPE DISCRIMINATION METHOD AND SHAPE DISCRIMINATION PROGRAM

CROSS REFERENCE TO RELATED APPLICATIONS

This application is a National Stage of International Application No. PCT/JP2015/086270 filed Dec. 25, 2015.

TECHNICAL FIELD

The present invention relates to a shape discrimination device, a shape discrimination method, and a shape discrimination program.

BACKGROUND ART

A system that searches a database storing images showing items such as clothing for an image of similar clothing is known. For example, the system disclosed in Patent Literature 1 extracts feature information from a whole input image and searches for an image having feature information highly similar to the extracted feature information as a similar image.

CITATION LIST

Patent Literature

PTL1: International Patent Publication No. WO 2011/078174

SUMMARY OF INVENTION

Technical Problem

However, in the case where an image is similar as a whole but is partly different in shape such as a neckline of clothing, for example, it is difficult to extract an image having a similar shape.

In view of the foregoing, an object of the present invention is to appropriately estimate the shape of an object or a part of an object shown in an image.

Solution to Problem

To solve the above problem, a shape discrimination device according to one embodiment of the present invention includes an approximate curve calculation means configured to calculate an approximate curve of a contour, the contour being a line having a finite length representing a part of an outline of an object shown in an image, the approximate curve being a line approximating to the contour and calculated based on coordinates forming the contour, a distance calculation means configured to calculate a first distance and a second distance being distances from a first end and a second end of the contour to a first end and a second end of the approximate curve, respectively, a coincidence calculation means configured to calculate a center coincidence being a degree of coincidence between a center of the contour and the approximate curve, a specifying means configured to specify a shape of the object or a part of the object based on the first distance, the second distance, and the center coincidence, and an output means configured to output information regarding the shape of the object or a part of the object specified by the specifying means.

A shape discrimination method according to one embodiment of the present invention is a shape discrimination method in a shape discrimination device, the method including an approximate curve calculation step of calculating an approximate curve of a contour, the contour being a line having a finite length representing a part of an outline of an object shown in an image, the approximate curve being a line approximating to the contour and calculated based on coordinates forming the contour, a distance calculation step of calculating a first distance and a second distance being distances from a first end and a second end of the contour to a first end and a second end of the approximate curve, respectively, a coincidence calculation step of calculating a center coincidence being a degree of coincidence between a center of the contour and the approximate curve, a specifying step of specifying a shape of the object or a part of the object based on the first distance, the second distance, and the center coincidence, and an output step of outputting information regarding the shape of the object or a part of the object specified in the specifying step.

A shape discrimination program according to one embodiment of the present invention causes a computer to function as an approximate curve calculation means configured to calculate an approximate curve of a contour, the contour being a line having a finite length representing a part of an outline of an object shown in an image, the approximate curve being a line approximating to the contour and calculated based on coordinates forming the contour, a distance calculation means configured to calculate a first distance and a second distance being distances from a first end and a second end of the contour to a first end and a second end of the approximate curve, respectively, a coincidence calculation means configured to calculate a center coincidence being a degree of coincidence between a center of the contour and the approximate curve, a specifying means configured to specify a shape of the object or a part of the object based on the first distance, the second distance, and the center coincidence, and an output means configured to output information regarding the shape of the object or a part of the object specified by the specifying means.

According to the embodiment described above, an approximate curve that approximates to a contour, which represents a part of the outline of an object shown in an image, is calculated, and first and second distances, which are distances between corresponding ends of the approximate curve and the contour, and a center coincidence, which is the degree of coincidence between the center of the contour and the approximate curve, are calculated. The characteristics of the shape of a part of an object are reflected on the first and second distances and the center coincidence. Because the shape of an object or the like is specified based on the first and second distances and the center coincidence, it is possible to appropriately estimate the shape of the object or the like.

A shape discrimination device according to another embodiment may further include an aspect calculation means configured to calculate an aspect being a ratio of a depth indicated by a longest distance among distances from a line connecting the first end and the second end of the contour to points on the approximate curve to an end-to-end distance being a distance between the first end and the second end of the contour, and the specifying means may specify the shape of the object or a part of the object based on the first distance, the second distance, the center coincidence, and the aspect.

According to the embodiment described above, because the aspect on which the shape of a part of an object is reflected is calculated, and the shape of the object or a part of the object is specified based on the aspect in addition to the first and second distances and the center coincidence, it is possible to appropriately estimate the shape of the object or the like which is characterized by the aspect.

In a shape discrimination device according to another embodiment, the approximate curve calculation means may calculate a first partial approximate curve and a second partial approximate curve respectively being approximate curves of a first partial contour and a second partial contour being segments of the contour divided at a deepest point as a boundary, the deepest point being a point with a longest distance from a line connecting the first end and the second end of the contour among points on the contour, and the specifying means may specify the shape of the object or a part of the object by further using tilts of the first partial approximate curve and the second partial approximate curve.

According to the embodiment described above, because the first partial approximate curve and the second partial approximate curve are calculated, and the shape of a part of an object is specified based the tilts of those partial approximate curves, it is possible to appropriately estimate the shape of an object or the like which is characterized by the tilts of the two partial contours, which are segments of a contour divided at the deepest point in the contour as the boundary.

In a shape discrimination device according to another embodiment, the approximate curve calculation means may calculate a third partial approximate curve, a fourth partial approximate curve and a fifth partial approximate curve respectively being approximate curves of a third partial contour, a fourth partial contour and a fifth partial contour being segments of the contour divided at each of both ends of a part of the contour coinciding with the approximate curve to a predetermined degree or more as a boundary, and the specifying means may specify the shape of the object or a part of the object by further using a degree of coincidence of the third partial approximate curve, the fourth partial approximate curve and the fifth partial approximate curve with the third partial contour, the fourth partial contour and the fifth partial contour, respectively.

According to the embodiment described above, because the third partial approximate curve, the fourth partial approximate curve and the fifth partial approximate curve are calculated, and the shape of an object or a part of an object is specified based on the degree of coincidence with the corresponding partial contours, it is possible to appropriately estimate the shape of an object or the like which is characterized by the three partial approximate curves.

In a shape discrimination device according to another embodiment, the approximate curve calculation means may calculate a plurality of quadratic curves based on arbitrary three points on the contour and calculate, as the approximate curve, a quadratic curve with a highest degree of coincidence with the contour among the plurality of calculated quadratic curves.

According to the embodiment described above, a quadratic curve with the highest degree of coincidence with the contour among a plurality of quadratic curves calculated based on three points on the contour is calculated as the approximate curve. Thus, even if noise is contained in a contour extracted from an image, a quadratic curve calculated with noise is not used as the approximate curve, and it is thereby possible to calculate an approximate curve that more accurately approximates to the shape of a part of an object.

In a shape discrimination device according to another embodiment, the shape of a part of the object may be the shape of a neckline of clothing.

According to the embodiment described above, it is possible to appropriately discriminate the shape of the neckline, which is the shape of a part of clothing.

In a shape discrimination device according to another embodiment, the specifying means may specify that the shape of the object or a part of the object is a first shape when the first distance and the second distance are both less than a predetermined value and the center coincidence is equal to or more than a predetermined degree.

According to the embodiment described above, it is possible to appropriately discriminate the shape of an object or a part of an object as a first shape which is characterized by the first and second distances and the center coincidence.

In a shape discrimination device according to another embodiment, the specifying means may specify that the shape of the object or a part of the object is a first shape when the first distance and the second distance are both equal to or more than a predetermined value and the aspect is less than a predetermined value.

According to the embodiment described above, it is possible to appropriately discriminate the shape of an object or a part of an object as a first shape which is characterized by the first and second distances and the aspect.

In a shape discrimination device according to another embodiment, the specifying means may specify that the shape of the object or a part of the object is a second shape when the first distance and the second distance are both less than a predetermined value, the center coincidence is less than a predetermined degree, and the tilt of the first partial approximate curve and the tilt of the second partial approximate curve coincide to a predetermined extent or more, the specifying means may specify that the shape of the object or a part of the object is a second shape when one of the first distance and the second distance is less than a predetermined value, the other one is equal to or more than a predetermined value, the center coincidence is less than a predetermined degree, and the tilt of the first partial approximate curve and the tilt of the second partial approximate curve coincide to a predetermined extent or more, and the specifying means may specify that the shape of the object or a part of the object is a third shape when one of the first distance and the second distance is less than a predetermined value, the other one is equal to or more than a predetermined value, the center coincidence is less than a predetermined degree, and the tilt of the first partial approximate curve and the tilt of the second partial approximate curve do not coincide to a predetermined extent or more.

According to the embodiment described above, it is possible to appropriately specify that the shape of an object or a part of an object is a second shape or a third shape based on the first and second distances, the center coincidence, and the degree of coincidence between the tilt of the partial approximate curve and the tilt of the second partial approximate curve.

In a shape discrimination device according to another embodiment, the specifying means may specify that the shape of the object or a part of the object is a fourth shape when one of the first distance and the second distance is less than a predetermined value, the other one is equal to or more than a predetermined value, the center coincidence is equal to or more than a predetermined degree, and a degree of coincidence of the third partial approximate curve, the fourth partial approximate curve and the fifth partial approximate curve with the third partial contour, the fourth partial contour and the fifth partial contour, respectively, is equal to or more than a predetermined degree, or when the first distance and the second distance are both equal to or more than a predetermined value, an aspect is equal to or more than a predetermined value, the aspect being a ratio of a depth indicated by a longest distance among distances from a line connecting the first end and the second end of the contour to points on the approximate curve to an end-to-end distance being a distance between the first end and the second end of the contour, and a degree of coincidence of the third partial approximate curve, the fourth partial approximate curve and the fifth partial approximate curve with the third partial contour, the fourth partial contour and the fifth partial contour, respectively, is equal to or more than a predetermined degree.

According to the embodiment described above, it is possible to appropriately specify that the shape of an object or a part of an object is a fourth shape having the characteristics that one of the first distance and the second distance is less than a predetermined value, the other one is equal to or more than a predetermined value and the center coincidence is equal to or more than a predetermined degree. Further, it is possible to appropriately specify that the shape of an object or a part of an object is a fourth shape having the characteristics that the first distance and the second distance are both equal to or more than a predetermined value, and the aspect is equal to or more than a predetermined value. Furthermore, because the shape of an object or a part of an object is specified as a fourth shape based on the fact that a degree of coincidence of the third partial approximate curve, the fourth partial approximate curve and the fifth partial approximate curve with the third partial contour, the fourth partial contour and the fifth partial contour, respectively, is equal to or more than a predetermined degree, it is possible to accurately specify the shape.

Advantageous Effects of Invention

According to one aspect of the present invention, it is possible to appropriately estimate the shape of an object or a part of an object shown in an image.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
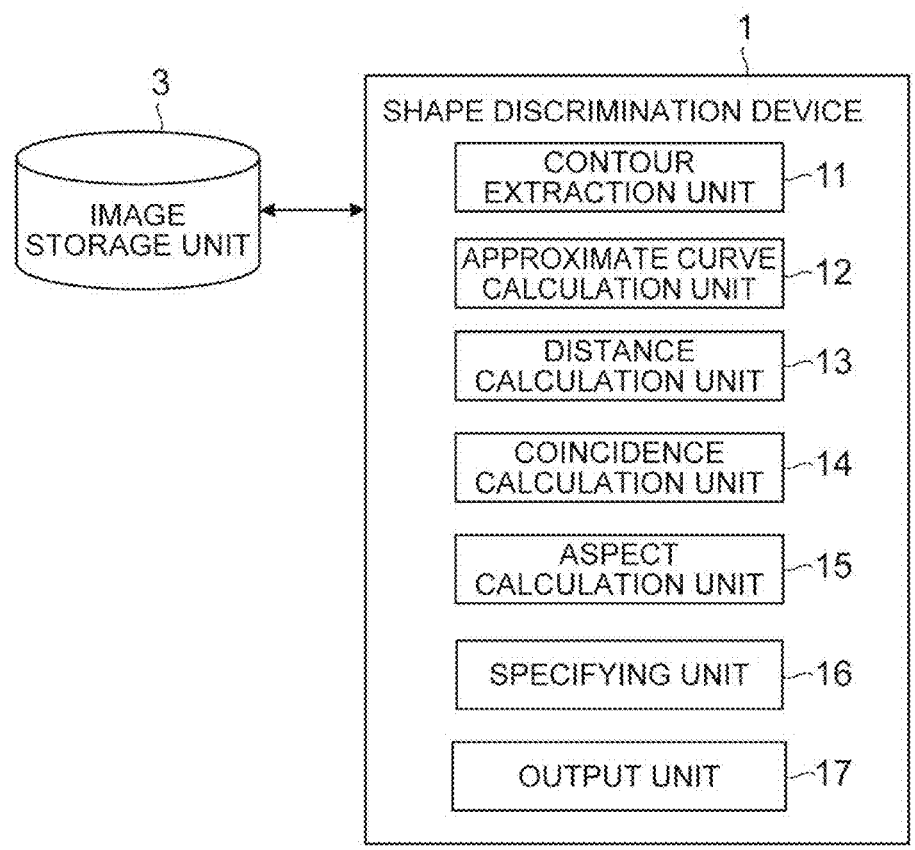
FIG. 1 is a block diagram showing a functional configuration of a shape discrimination device.

FIG. 1 is a block diagram showing a functional configuration of a shape discrimination device 1 according to this embodiment. The shape discrimination device 1 is a device that discriminates the shape of a part of an object shown in an image. As shown in FIG. 1, the shape discrimination device 1 can access an image storage unit 3. Note that the image storage unit 3 may be included in the shape discrimination device 1.

The shape discrimination device 1 is a device on an electronic commerce site that receives, from a user, an order of a product that is sold through a network, for example, and it discriminates the shape of clothing or the like sold. The shape discrimination device 1 according to this embodiment is a device that discriminates the shape of clothing.

As shown in FIG. 1, the shape discrimination device 1 functionally includes a contour extraction unit 11, an approximate curve calculation unit 12 (approximate curve calculation means), a distance calculation unit 13 (distance calculation means), a coincidence calculation unit 14 (coincidence calculation means), an aspect calculation unit 15 (aspect calculation means), a specifying unit 16 (means), and an output unit 17 (output means).

Figure 2:
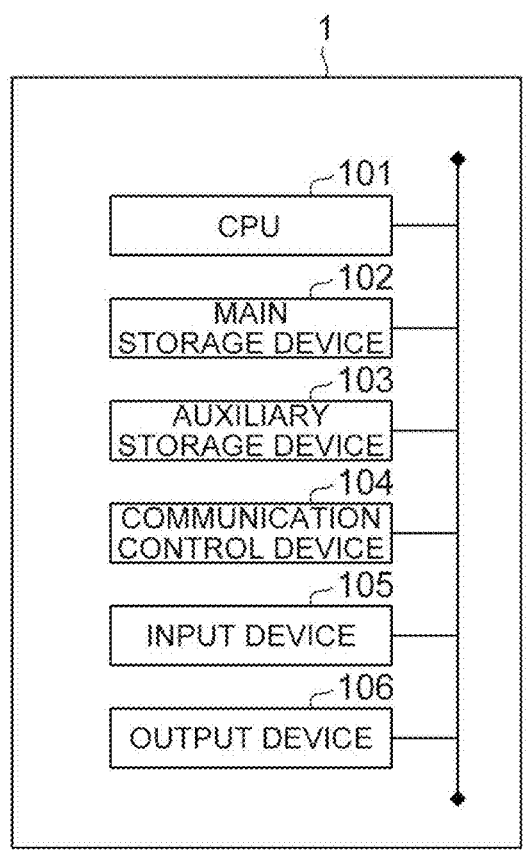
FIG. 2 is a view showing a hardware configuration of the shape discrimination device.

FIG. 2 is the hardware configuration diagram of the shape discrimination device 1. As shown in FIG. 2, the shape discrimination device 1 is physically configured as a computer system that includes a CPU 101, a main storage device 102 such as memory like RAM and ROM, an auxiliary storage device 103 such as a hard disk, a communication control device 104 such as a network card and the like. The shape discrimination device 1 may further include an input device 105 such as a keyboard and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the shape discrimination device 1, the image processing unit is described with reference back to FIG. 2.

In the case where the shape discrimination device 1 is configured as a device that discriminates the shape of clothing as described above, the image storage unit 3 stores a plurality of images showing clothing. In this embodiment, the shape discrimination device 1 discriminates the shape of the neckline of clothing in particular.

Referring again to FIG. 2, the functional units of the shape discrimination device 1 are described hereinafter. The contour extraction unit 11 extracts a contour from an image showing clothing. The contour is a line having a finite length, which represents a part of the outline of an object shown in an image. In this embodiment, the contour represents the outline of the neckline of clothing shown in an image.

Figure 3:
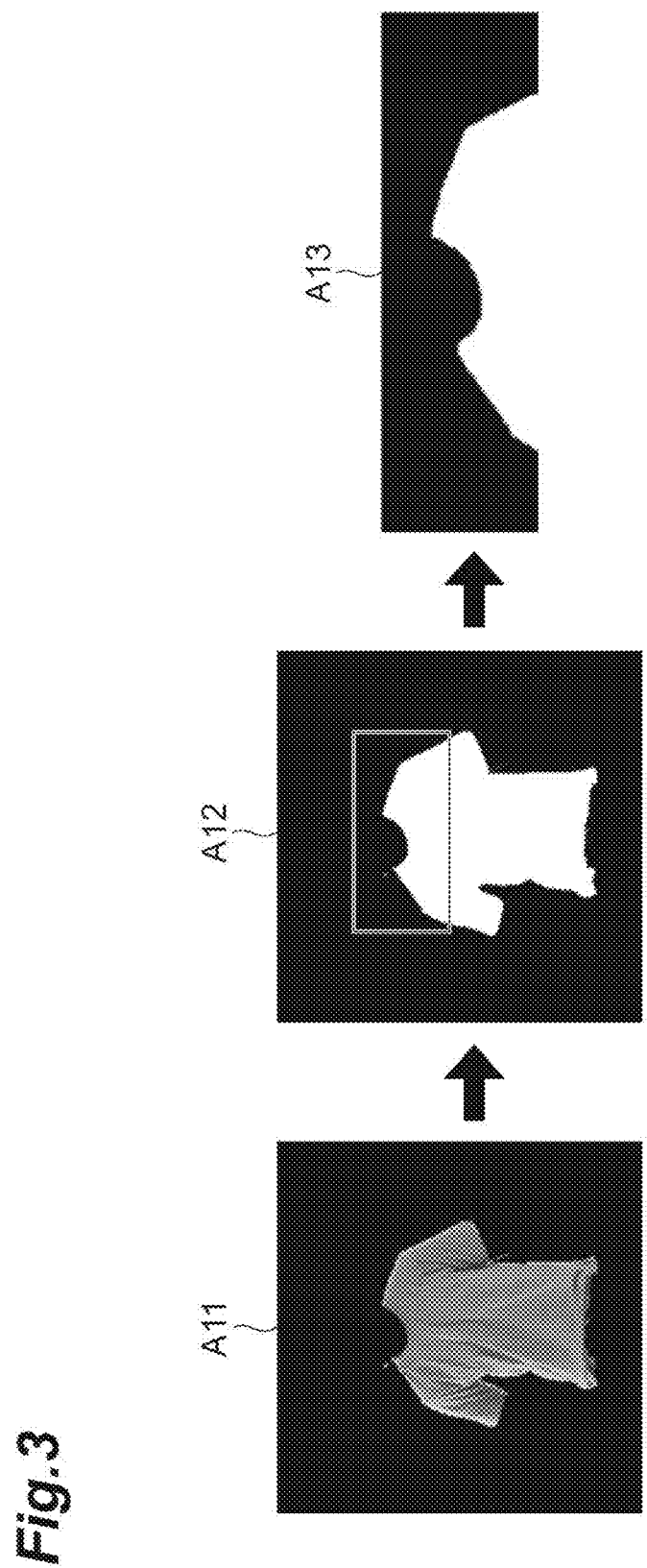
FIG. 3 is a view showing a process of acquiring a binary image of a part showing a neckline from a clothing image.

A process of extracting a contour from a clothing image is described hereinafter with reference to FIGS. 3 to 6. FIG. 3 is a view showing a process of acquiring a binary image of a part showing a neckline from a clothing image. First, the contour extraction unit 11 acquires a clothing image A11 to be processed from the image storage unit 3. The clothing image A11 shows an image of a shirt. Next, the contour extraction unit 11 binarizes the clothing image A11 and thereby generates a binary image A12. In the binary image A12, a part representing a shift is shown in white, and the background is shown in black. The contour extraction unit 11 then extracts, from the binary image A12, a partial binary image A13 that contains a part representing the neckline. To be specific, the contour extraction unit 11 extracts a certain region that contains the upper one-third of the part representing clothing in the binary image A12, for example, and generates the partial binary image A13.

Figure 4:
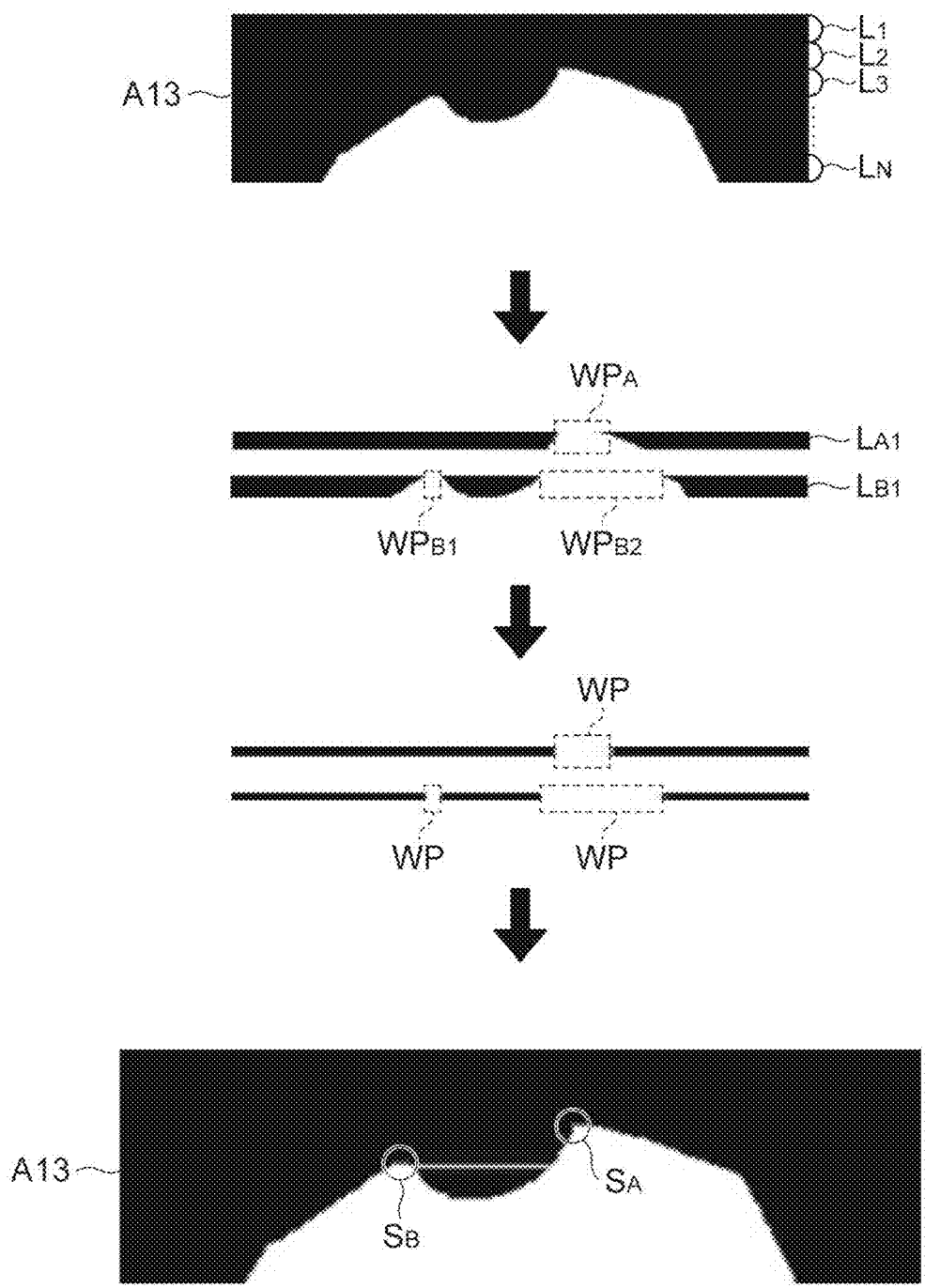
FIG. 4 is a view showing a process of detecting a shoulder part of clothing from a partial binary image.

FIG. 4 is a view showing a process of detecting a shoulder part of clothing from the partial binary image A13. The contour extraction unit 11 first divides the partial binary image A13 horizontally in the figure. The contour extraction unit 11 divides the partial binary image A13 and thereby generates segmented images $L_1$ to $L_N$ with a vertical length of 10 pixels, for example.

Then, the contour extraction unit 11 compresses each segmented image into data with a vertical length of 1 pixel, treating a part where all of the vertical 10 pixels are white as white pixels and the other part as black pixels. To be specific, because the segmented image $L_{A1}$ contains a white part $WP_A$, the contour extraction unit 11 generates a compressed segmented image $L_{A2}$ with a vertical length of 1 pixel where a part corresponding to the white part $WP_A$ is composed of white pixels and the other part is composed of black pixels. Further, because the segmented images $L_{B1}$ contains white parts $WP_{B1}$ and $WP_{B2}$, the contour extraction unit 11 generates a compressed segmented image $L_{B2}$ with a vertical length of 1 pixel where a part corresponding to the parts $WP_{B1}$ and $WP_{B2}$ is composed of white pixels and the other part is composed of black pixels.

Then, the contour extraction unit 11 checks out the compressed segmented images generated from the segmented images $L_1$ to $L_N$ sequentially from the top and extracts the compressed segmented image $L_{A2}$ that contains one white part WP. The contour extraction unit 11 further checks out the lower segmented images sequentially and extracts the compressed segmented image $L_{B2}$ that contains two white parts WP.

After that, the contour extraction unit 11 specifies a position corresponding to the compressed segmented image $L_{A2}$ in the partial binary image A13 as a position representing one shoulder part. Further, the contour extraction unit 11 specifies a position corresponding to the compressed segmented image $L_{B2}$ in the partial binary image A13 as a position representing the other shoulder part. Based on the specified positions of shoulder parts, the contour extraction unit 11 specifies shoulder parts $S_A$ and $S_B$ in the partial binary image A13.

Figure 5:
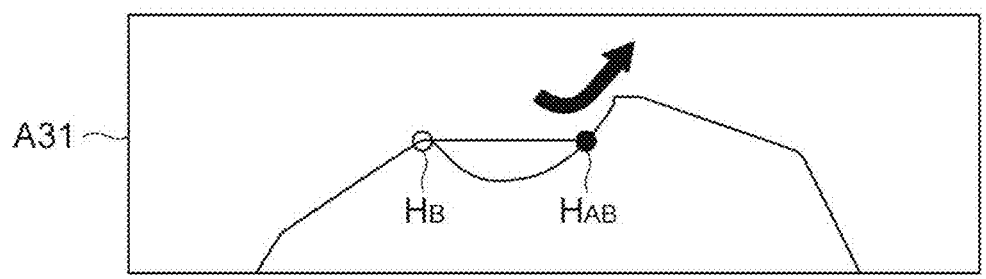
FIG. 5 is a view showing a process of specifying a shoulder part of clothing shown in an image.
Figure 5:
Figure 5:
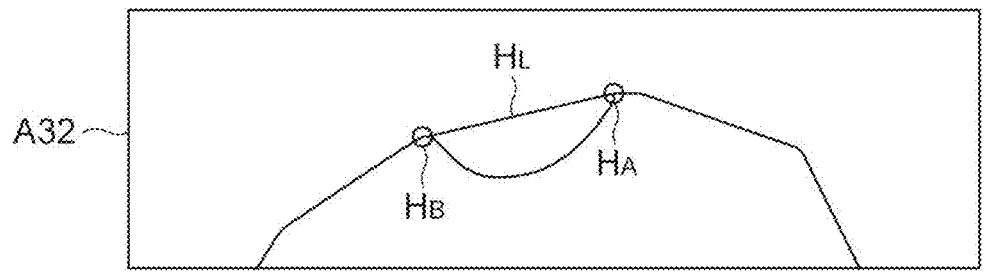
Figure 6:
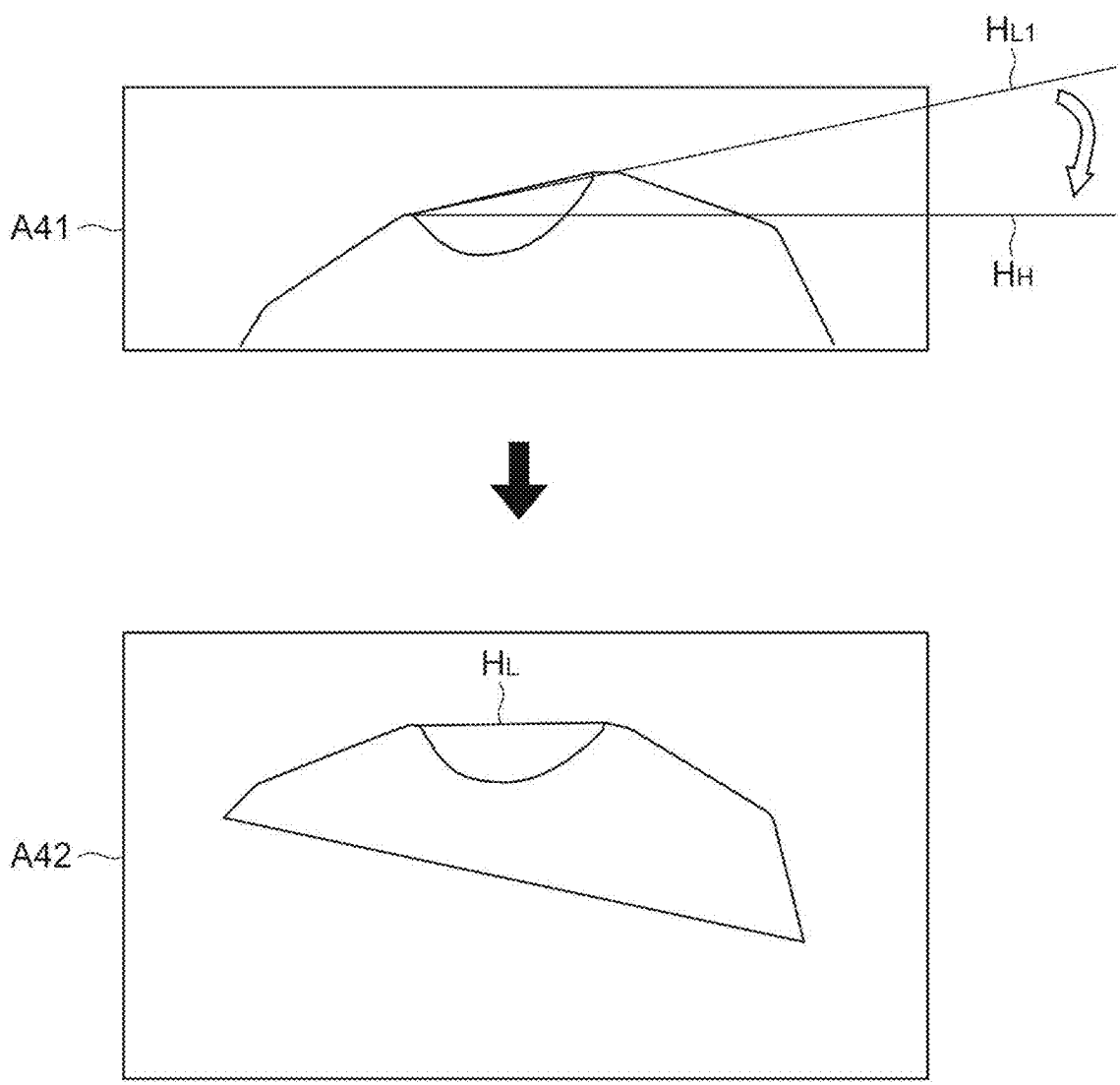
FIG. 6 is a view illustrating a process of correcting the tilt of a clothing image.

FIGS. 5 and 6 are views illustrating a process of acquiring the tilt of a line connecting two shoulder parts of clothing shown in an image and correcting the tilt of the clothing image. FIG. 5 is a view showing a process of more precisely specifying shoulder parts. In an image A31, the contour extraction unit 11 traces, upward in the figure, the boundary between a white part representing clothing and a black part not representing clothing based on the shoulder part $S_B$ specified by the process described in FIG. 4, and specifies the uppermost point on the boundary as a shoulder part $H_B$.

Further, the contour extraction unit 11 specifies an intersection $H_{AB}$ between a line extending from the shoulder part $H_B$ horizontally in the figure (X direction) and the boundary between the white part and the black part, traces the boundary between the white part and the black part from the intersection $H_{AB}$ in the direction opposite to the shoulder part $H_B$, and specifies the uppermost point on the boundary (the point with the maximum Y coordinate) as a shoulder part $H_A$ as shown in an image A32. Then, a line $H_L$ that connects the shoulder part $H_A$ and the shoulder part $H_B$, which represent the both shoulder parts of the clothing, is defined. Note that the shoulder part $H_A$ and the shoulder part $H_B$ are one end and the other end of the contour. In other words, the contour is a line having a finite length, which ends at the shoulder part $H_A$ and the shoulder part $H_B$.

FIG. 6 is a view illustrating a process of correcting the tilt of a clothing image. As indicated by a line $H_{L1}$, which is an extension of the line $H_L$ in an image A41, the clothing shown in the image A41 is tilted with respect to the horizontal line $H_H$. The contour extraction unit 11 rotates the image of the clothing shown in the image A41 so that the line $H_L$ coincides with the horizontal line $H_u$ and obtains an image A42.

Figure 7:
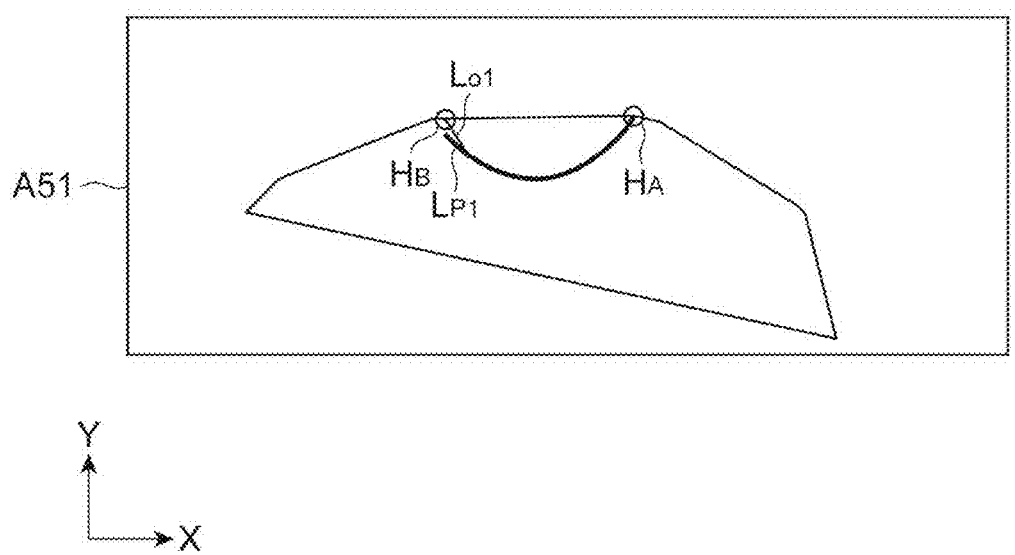
FIG. 7 is a view showing an example of calculation of a contour and an approximate curve.

FIG. 7 is a view showing an example of extraction of a contour and calculation of an approximate curve. As shown in an image A51, the contour extraction unit 11 extracts, as a contour $L_{O1}$, the outline (the boundary between the white part and the black part) of the neckline having the shoulder part $H_A$ and the shoulder part $H_B$ at both ends.

The approximate curve calculation unit 12 is a part that calculates an approximate curve of a contour. The approximate curve calculation unit 12 calculates an approximate curve based on the coordinates that form a contour. The calculation of an approximate curve is specifically described hereinbelow.

First, the approximate curve calculation unit 12 acquires the coordinates of arbitrary three points on the contour $L_{O1}$. Next, the approximate curve calculation unit 12 calculates a quadratic curve by the method of least square based on the acquired coordinates of three points. Note that the approximate curve calculation unit 12 calculates the quadratic curve as a finite line so that the X coordinates of one and the other ends of the quadratic curve are equal to the X coordinates of one and the other ends of the contour. Based on the calculated quadratic curve, the approximate curve calculation unit 12 calculates a consensus, which indicates the degree of coincidence between the quadratic curve and the contour. The consensus is the ratio of points existing on the quadratic curve to all points constituting the contour.

The approximate curve calculation unit 12 repeats the extraction of any three points on the contour $L_{O1}$ and the calculation of a quadratic curve and a consensus, and calculates a quadratic curve with the highest consensus among the calculated quadratic curves as an approximate curve $L_{P1}$ of the contour $L_{O1}$. The number of quadratic curves calculated by the approximate curve calculation unit 12 may be a preset specified number or the number of quadratic curves that can be calculated within a specified processing time. Further, the approximate curve calculation unit 12 may calculate quadratic curves for all combinations of three points that can be selected on the contour $L_{O1}$.

In this manner, because a quadratic curve with the highest degree of coincidence with the contour among a plurality of quadratic curves calculated based on three points on the contour is calculated as the approximate curve, if noise is contained in a contour extracted from an image, a quadratic curve calculated with noise is not used as the approximate curve, and it is thereby possible to calculate an approximate curve that more accurately approximates to the shape of a part of an object.

Note that the approximate curve calculation unit 12 may calculate two partial approximate curves that approximate to two partial contours, which are segments of a contour divided at one point. Further, the approximate curve calculation unit 12 may calculate three partial approximate curves that approximate to three partial contours, which are segments of a contour divided at two points. The calculation of such partial approximate curves is described later.

Figure 8:
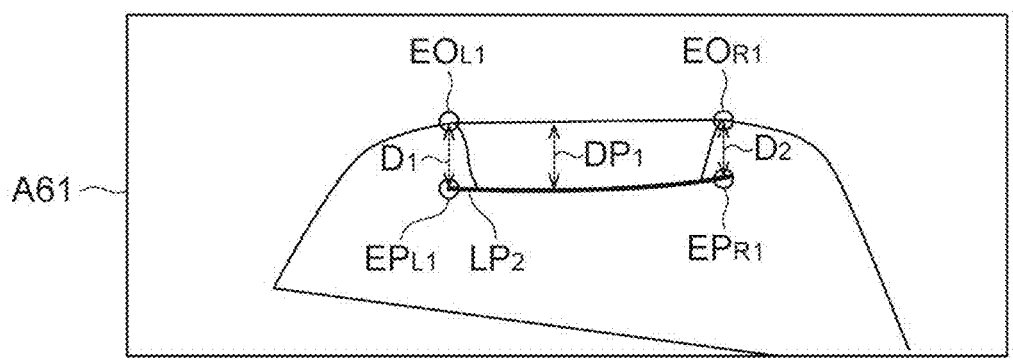
FIG. 8 is a view illustrating calculation of first and second distances.

The distance calculation unit 13 is a part that calculates a first distance and a second distance, which are distances from first and second ends of a contour to respectively corresponding first and second ends of an approximate curve. The calculation of the first and second distances is described hereinafter with reference to FIG. 8. As shown in FIG. 8, in the image of clothing shown in an image A61, a first end $EO_{L1}$ and a second end $EO_{R1}$ of a contour, and an approximate curve $L_{P2}$ are calculated by the contour extraction unit 11 and the approximate curve calculation unit 12. The approximate curve $L_{P2}$ has a first end $EP_{L1}$ and a second end $EP_{R1}$.

The distance calculation unit 13 calculates the distance between the first end $EO_{L1}$ and the first end $EP_{L1}$ as a first distance $D_1$, and calculates the distance between the first end $EO_{R1}$ and the first end $EP_{R1}$ as a second distance $D_2$. Note that the distance calculation unit 13 may calculate a normalized value obtained by dividing the distance between the first end $EO_{L1}$ and the first end $EP_{L1}$ by a depth $DP_1$ as the first distance $D_1$, and calculate a normalized value obtained by dividing the distance between the second end $EO_{R1}$ and the second end $EP_{R1}$ by a depth $DP_1$ as the second distance $D_2$. The depth $DP_1$ indicates the longest distance among the distances from a line connecting the first end $EO_{L1}$ and the first end $EP_{L1}$ of the contour to points on the approximate curve $L_{P2}$.

Figure 9:
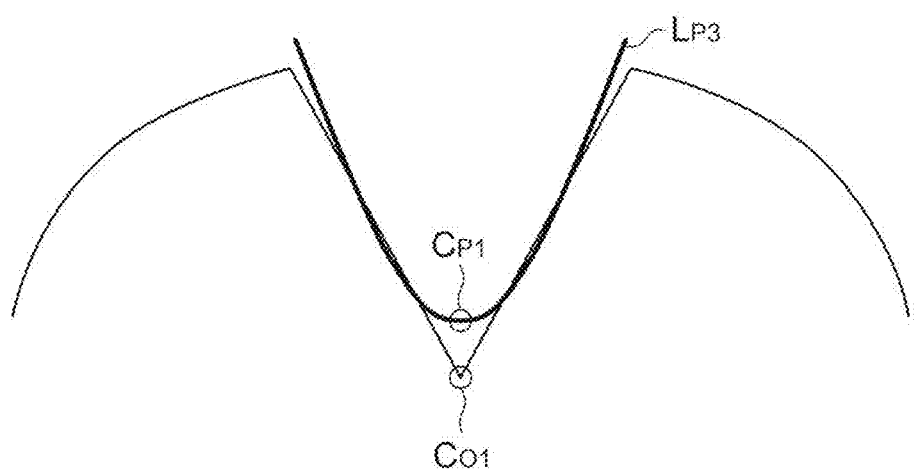
FIG. 9 is a view illustrating calculation of a center coincidence.

The coincidence calculation unit 14 is a part that calculates a center coincidence, which is the degree of coincidence between the center of a contour and an approximate curve. The calculation of the center coincidence is described with reference to FIG. 9. In the image of clothing shown in FIG. 9, a center $C_{O1}$ of a contour extracted by the contour extraction unit 11, an approximate curve $L_{P3}$ calculated by the approximate curve calculation unit 12, and a center $C_{p1}$ of the approximate curve $L_{P3}$ are shown.

The coincidence calculation unit 14 calculates the center coincidence based on the distance between the center $C_{O1}$ of the contour and the center $C_{p1}$ of the approximate curve $L_{P3}$.

A method of calculating the center coincidence is not particularly limited, as long as it is an index value indicating that the center coincidence is highest when the distance between the center $C_{O1}$ and the center $C_{P1}$ is zero.

Figure 10:
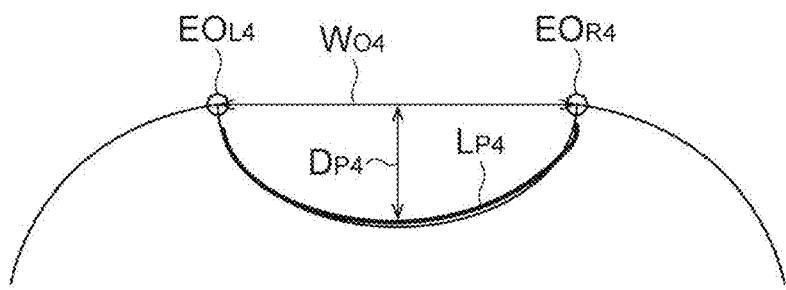
FIG. 10 is a view illustrating calculation of an aspect.

The aspect calculation unit 15 is a part that calculates an aspect, which is the ratio of the depth to the distance between both ends of a contour. The depth is the longest distance among the distances from a line connecting both ends of a contour to points on an approximate curve. The calculation of an aspect is described hereinafter with reference to FIG. 10. In the image of clothing shown in FIG. 10, the contour of a neckline calculated by the contour extraction unit 11 and an approximate curve $L_{P4}$ calculated by the approximate curve calculation unit 12 are shown.

The aspect calculation unit 15 calculates an end-to-end distance $W_{O4}$, which is the distance between a first end $EO_{L4}$ and a second end $EO_{L4}$ of the contour. Next, the aspect calculation unit 15 calculates a depth $DP_N$, which indicates the longest distance among distances from a line connecting the first end $EO_{L4}$ and the second end $EO_{L4}$ to points on the approximate curve $L_{P4}$. The aspect calculation unit 15 then calculates, as the aspect, the ratio of the depth $DP_{P4}$ to the end-to-end distance $W_{O4}$.

Although the depth is the longest distance among distances from a line connecting both ends of a contour to points on an approximate curve in this embodiment, the depth may be the longest distance among distances from a line connecting both ends of a contour to points on the contour. Further, the aspect calculation unit 15 is not an essential element for the shape discrimination device 1 according to this embodiment, as there is a case where the aspect is not used when specifying the shape of an object by the specifying unit 16, which is described later.

The specifying unit 16 is a part that specifies the shape of an object or a part of an object based on the first distance and the second distance calculated by the distance calculation unit 13 and the center coincidence calculated by the coincidence calculation unit 14. In this embodiment, the specifying unit 16 specifies the shape of the neckline of clothing.

Further, the specifying unit 16 may specify the shape of an object or a part of an object by further using the aspect calculated by the aspect calculation unit 15. By using the aspect for specifying the shape, it is possible to appropriately estimate the shape of a part of an object which is characterized by the aspect. Note that the process of specifying the shape of an object or a part of an object by the specifying unit 16 is described in detail later with reference to FIG. 13 and the like.

Figure 11:
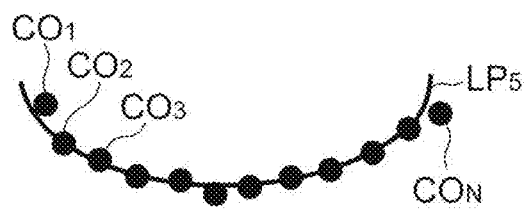
FIG. 11 is a view illustrating calculation of a consensus.

Furthermore, the specifying unit 16 may specify the shape of an object or a part of an object by further using a consensus, which indicates the degree of coincidence between the contour extracted by the contour extraction unit 11 and the approximate curve calculated by the approximate curve calculation unit 12. The calculation of a consensus by the specifying unit 16 is described hereinafter with reference to FIG. 11. FIG. 11 shows an approximate curve $L_{P5}$ calculated by the approximate curve calculation unit 12 based on an image of clothing and points $CO_1$, $CO_2$, $CO_3$, ... $CO_N$ on a contour.

The specifying unit 16 calculates the ratio of points existing on the approximate curve $L_{P5}$ to all points $CO_1$, $CO_2$, $CO_3$, ... $CO_N$ on the contour as the consensus. In other words, the specifying unit 16 calculates (the number of points on the contour which exist on the approximate curve/the number of points on the contour) as the consensus.

Further, in the case where first and second partial approximate curves, which are two partial approximate curves that approximate to two partial contours, which are segments of a contour divided at one point, is calculated by the approximate curve calculation unit 12, the specifying unit 16 may specify the shape of an object or a part of an object based on whether or not the tilt of the first partial approximate curve and the tilt of the second partial approximate curve coincide to a predetermined extent or more. It is thereby possible to appropriately estimate the shape of a part of an object which is characterized by the tilts of the two partial contours, which are segments of a contour divided at the deepest point in the contour as the boundary. The specification based on the tilts of the first and second partial approximate curves is described later with reference to FIG. 13 and the like.

The output unit 17 outputs information about the shape of the object or a part of the object specified by the specifying unit 16. To be specific, the output unit 17 may store information about the shape of an object or a part of an object shown in an image as the attribute of this image into a specified storage means (e.g., the image storage unit 3) in association with the image. Further, the output unit 17 may perform control to display information about the shape of an object or a part of an object shown in an image on a display in association with the image.

Further, the output unit 17 may perform processing to classify a plurality of images stored in the image storage unit 3 based on information about the shape of an object or a part of an object shown in the images.

Figure 12:
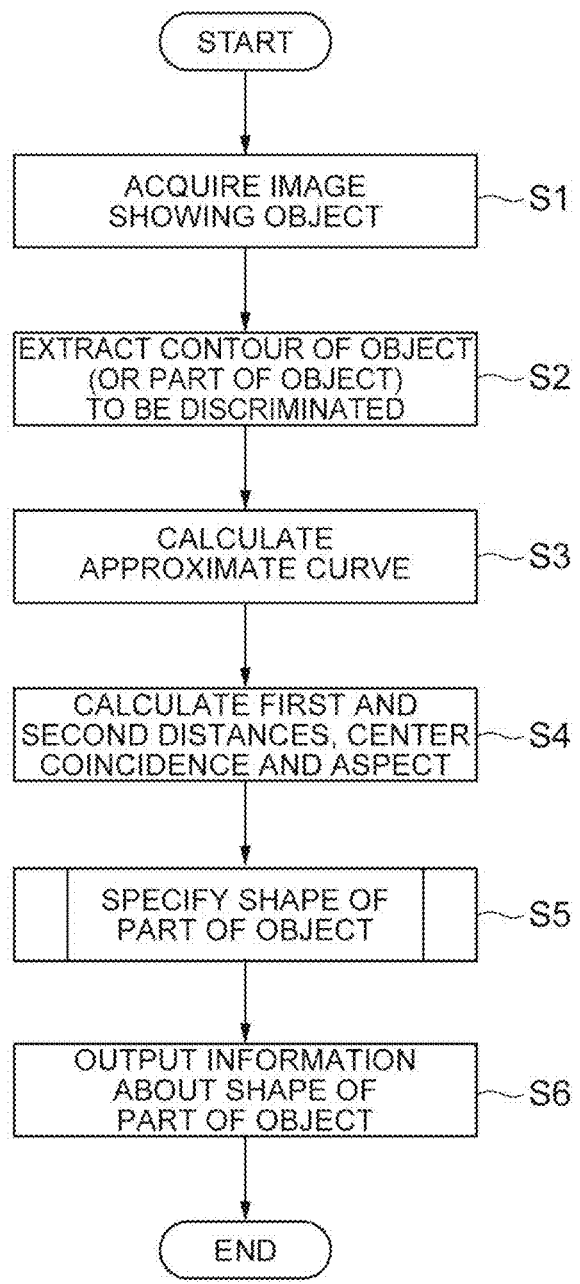
FIG. 12 is a flowchart showing a process of a shape discrimination method performed in the image display device.

The operation of the shape discrimination device 1 according to this embodiment is described hereinafter with reference to FIG. 12. FIG. 12 is a flowchart showing a process of a shape discrimination method performed in the shape discrimination device 1.

First, the contour extraction unit 11 acquires an image in which an object is shown (S1). To be specific, the contour extraction unit 11 acquires an image in which clothing is shown from the image storage unit 3. Next, the contour extraction unit 11 extracts the contour of the object or a part of the object (S2). In this embodiment, the contour extraction unit 11 extracts, as the contour, the outline of the neckline of the clothing shown in the image acquired in Step S1.

Next, the approximate curve calculation unit 12 calculates an approximate curve of the contour extracted in Step S2 based on the coordinates that form the contour (S3). The distance calculation unit 13 then calculates a first distance and a second distance, which are distances from first and second ends of the contour to corresponding first and second ends of the approximate curve, respectively (S4). Further, the coincidence calculation unit 14 calculates a center coincidence, which is the degree of coincidence between the center of the contour and the approximate curve (S4). Further, the aspect calculation unit 15 may calculate an aspect, which is the ratio of the depth to the distance between both ends of the contour (S4).

Then, the specifying unit 16 performs a process of specifying the shape of a part of the object based on the information calculated in Step S4 (S5). In this embodiment, the specifying unit 16 specifies the shape of the neckline of clothing. The output unit 17 then outputs information about the shape of a part of the object specified in Step S5 (S6). In this embodiment, the output unit 17 outputs information about the shape of the neckline of clothing.

Figure 13:
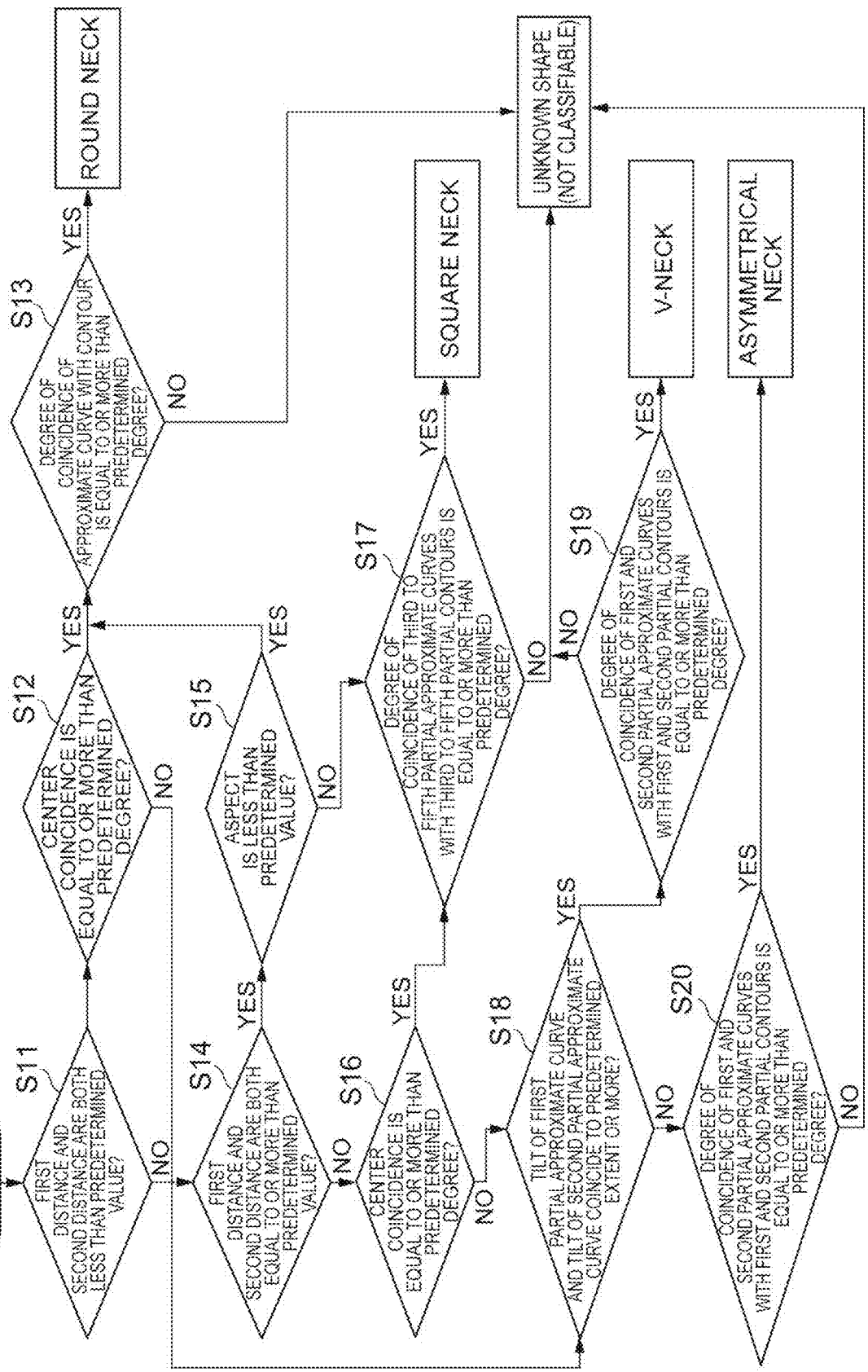
FIG. 13 is a flowchart showing a specifying process in Step S5 of the flowchart in FIG. 12.

The process of specifying the shape of a part of an object in Step S5 of the flowchart in FIG. 12 is specifically described with reference to FIGS. 13 and 14 to 19. FIG. 13 is a flowchart showing the specifying process in Step S5 of the flowchart in FIG. 12. FIGS. 14 to 19 are an example of a clothing image, which is a target of shape discrimination.

Figure 14:
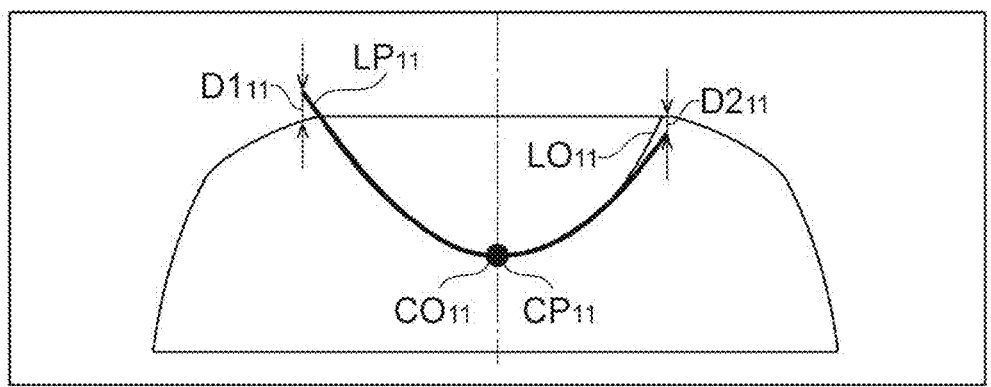
FIG. 14 is an example of a clothing image, which is a target of shape discrimination.

FIG. 14 is a view showing an example in which the specifying unit 16 specifies that the shape of a part of an object is a first shape in the case where the first distance and the second distance are both less than a predetermined value and the center coincidence is equal to or more than a predetermined degree. In this embodiment, the specifying unit 16 specifies that the shape of the neckline of clothing shown in the image is a round neck in such a case.

In the clothing image shown in FIG. 14, a contour $LO_{11}$ and an approximate curve $LP_{11}$ are shown, and further a first distance $D1_{11}$ and a second distance $D2_{11}$, which are distances from the first and second ends of the contour $LO_{11}$ to the corresponding first and second ends of the approximate curve $LP_{11}$, respectively, are shown.

In Step S11, the specifying unit 16 determines whether or not the first distance $D1_{11}$ and the second distance $D2_{11}$ are both less than a predetermined value. When it is determined that the first distance $D1_{11}$ and the second distance $D2_{11}$ are both less than a predetermined value, the process proceeds to Step S12. On the other hand, when it is not determined that the first distance $D1_{11}$ and the second distance $D2_{11}$ are both less than a predetermined value, the process proceeds to Step S14. In the example of FIG. 14, because the first distance $D1_{11}$ and the second distance $D2_{11}$ are both less than a predetermined value, the process proceeds to Step S12.

In Step S12, the specifying unit 16 determines whether or not the center coincidence, which is the degree of coincidence between the center $CO_{11}$ of the contour $LO_{11}$ and the center $CP_{11}$ of the approximate curve $LP_{11}$, is equal to or more than a predetermined degree. When it is determined that the center coincidence is equal to or more than a predetermined degree, the process proceeds to Step S13. On the other hand, when it is not determined that the center coincidence is equal to or more than a predetermined degree, the process proceeds to Step S18. In the example of FIG. 14, because the center $CO_{11}$ and the center $CP_{11}$ substantially coincide, and therefore the center coincidence is equal to or more than a predetermined degree, the process proceeds to Step S13.

In Step S13, the specifying unit 16 determines whether or not a consensus, which is the degree of coincidence of the approximate curve $LP_{11}$ with the contour $LO_{11}$, is equal to or more than a predetermined degree. When it is determined that the consensus is equal to or more than a predetermined degree, the specifying unit 16 specifies that the shape of the neckline of clothing shown in the image is a round neck. On the other hand, when it is not determined that the consensus is equal to or more than a predetermined degree, the specifying unit 16 specifies that the shape of the neckline of clothing shown in the image is an unknown shape and is not classifiable. In the example of FIG. 14, because the consensus of the approximate curve $LP_{11}$ with respect to the contour $LO_{11}$ is equal to or more than a predetermined degree, the specifying unit 16 specifies that the shape of the neckline of clothing shown in FIG. 14 is a round neck.

Figure 15:
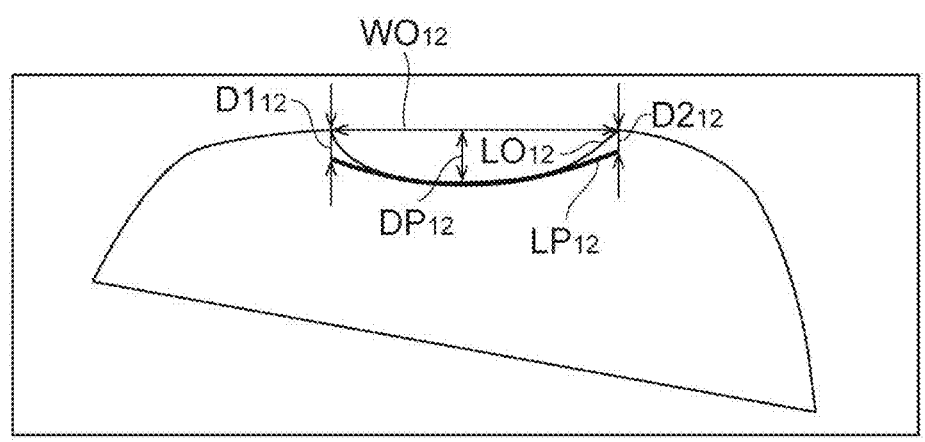
FIG. 15 is an example of a clothing image, which is a target of shape discrimination.

Next, the process in the flowchart of FIG. 13 is described with reference to FIG. 15. FIG. 15 is a view showing an example in which the specifying unit 16 specifies that the shape of a part of an object is a first shape in the case where the first distance and the second distance are both equal to or more than a predetermined value and the aspect is less than a predetermined value. In this embodiment, the specifying unit 16 specifies that the shape of the neckline of clothing shown in the image is a round neck in such a case.

In the clothing image shown in FIG. 15, a contour $LO_{12}$, an approximate curve $LP_{12}$, and a first distance $D1_{12}$ and a second distance $D2_{12}$, which are distances from the first and second ends of the contour $LO_{12}$ to the corresponding first and second ends of the approximate curve $LP_{12}$, respectively, are shown. Further, an end-to-end distance $WO_{12}$, which is the distance between the first end and the second end of the contour $LO_{12}$, and a depth $DP_{12}$, which is the longest distance among the distances from a line connecting the first end and the second end of the contour $LO_{12}$ to points on the approximate curve $LP_{12}$, are shown.

In Step S11, the specifying unit 16 determines whether or not the first distance $D1_{12}$ and the second distance $D2_{12}$ are both less than a predetermined value. In the example of FIG. 15, because the first distance $D1_{12}$ and the second distance $D2_{12}$ are both not less than a predetermined value, the process proceeds to Step S14.

In Step S14, the specifying unit 16 determines whether or not the first distance $D1_{12}$ and the second distance $D2_{12}$ are both equal to or more than a predetermined value. When it is determined that the first distance $D1_{12}$ and the second distance $D2_{12}$ are both equal to or more than a predetermined value, the process proceeds to Step S15. On the other hand, when it is not determined that the first distance $D1_{12}$ and the second distance $D2_{12}$ are both equal to or more than a predetermined value, the process proceeds to Step S16. In the example of FIG. 15, because the first distance $D1_{12}$ and the second distance $D2_{12}$ are both equal to or more than a predetermined value, the process proceeds to Step S15.

In Step S15, the specifying unit 16 determines whether or not an aspect, which is the ratio of the depth to the end-to-end distance, is less than a predetermined value. When it is determined that the aspect is less than a predetermined value, the process proceeds to Step S13. On the other hand, when it is not determined that the aspect is less than a predetermined value, the process proceeds to Step S17. In the example of FIG. 15, because the aspect, which is calculated as the ratio of the depth $DP_{12}$ to the end-to-end distance $WO_{12}$, is less than a predetermined value, the process proceeds to Step S13.

In Step S13, the specifying unit 16 determines whether or not a consensus, which is the degree of coincidence of the approximate curve $LP_{12}$ with the contour $LO_{12}$, is equal to or more than a predetermined degree. In the example of FIG. 15, because the consensus of the approximate curve $LP_{12}$ with respect to the contour $LO_{12}$ is equal to or more than a predetermined degree, the specifying unit 16 specifies that the shape of the neckline of clothing shown in FIG. 15 is a round neck.

Figure 16:
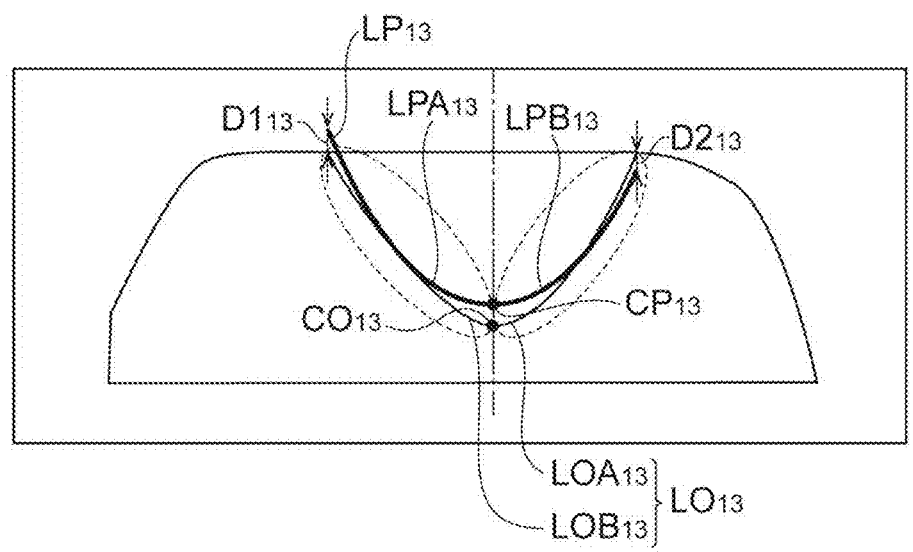
FIG. 16 is an example of a clothing image, which is a target of shape discrimination.

Next, the process in the flowchart of FIG. 13 is described with reference to FIG. 16. FIG. 16 is a view showing an example in which the specifying unit 16 specifies that the shape of a part of an object is a second shape in the case where the first distance and the second distance are both less than a predetermined value, the center coincidence is less than a predetermined degree, and the tilt of the first partial approximate curve and the tilt of the second partial approximate curve coincide to a predetermined extent or more. In this embodiment, the specifying unit 16 specifies that the shape of the neckline of clothing shown in the image is a V-neck in such a case.

In the clothing image shown in FIG. 16, a contour $LO_{13}$, an approximate curve $LP_{13}$, and a first distance $D1_{13}$ and a second distance $D2_{13}$, which are distances from the first and second ends of the contour $LO_{13}$ to the corresponding first and second ends of the approximate curve $LP_{13}$, respectively, are shown. Further, a first partial contour $LOA_{13}$ and a second partial contour $LOB_{13}$, which are segments of the contour $LO_{13}$ divided at the deepest point, which is the point with the longest distance from a line connecting the first end and the second end of the contour $LO_{13}$ among the points on the contour $LO_{13}$, as the boundary are shown. Further, a first partial approximate curve $LPA_{13}$ and a second partial approximate curve $LPB_{13}$, which are the approximate curves of the first partial contour $LOA_{13}$ and the second partial contour $LOB_{13}$, respectively, are shown.

In Step S11, the specifying unit 16 determines whether or not the first distance $D1_{13}$ and the second distance $D2_{13}$ are both less than a predetermined value. In the example of FIG. 16, because the first distance $D1_{13}$ and the second distance $D2_{13}$ are both less than a predetermined value, the process proceeds to Step S12.

In Step S12, the specifying unit 16 determines whether or not the center coincidence, which is the degree of coincidence between the center $CO_{13}$ of the contour $LO_{13}$ and the center $CP_{13}$ of the approximate curve $LP_{13}$, is equal to or more than a predetermined degree. In the example of FIG. 16, because the center $CO_{13}$ and the center $CP_{13}$ do not coincide, and therefore the center coincidence is not equal to or more than a predetermined degree, the process proceeds to Step S18.

In Step S18, the specifying unit 16 determines whether or not the tilt of the first partial approximate curve $LPA_{13}$ and the tilt of the second partial approximate curve $LPB_{13}$ coincide to a predetermined extent or more.

The approximate curve calculation unit 12 calculates the first partial contour $LOA_{13}$ and the second partial contour $LOB_{13}$, which are segments of the contour $LO_{13}$ divided at the deepest point, which is the point with the longest distance from a line connecting the first end and the second end of the contour $LO_{13}$ among the points on the contour $LO_{13}$ as the boundary. Then, the approximate curve calculation unit 12 calculates the first partial approximate curve $LPA_{13}$ and the second partial approximate curve $LPB_{13}$, which respectively approximate to the first partial contour $LOA_{13}$ and the second partial contour $LOB_{13}$. The calculation of the first partial approximate curve $LPA_{13}$ based on the first partial contour $LOA_{13}$ and the calculation of the second partial approximate curve $LPB_{13}$ based on the second partial contour $LOB_{13}$ are performed in the same manner as the calculation of the approximate curve $L_{P1}$ based on the contour $L_{O1}$ described with reference to FIG. 7.

The comparison between the tilts of the partial approximate curves is performed by inverting one of the first and second partial approximate curves with respect to a vertical line as an axis. Specifically, it is determined that the shape of the neckline is symmetric with respect to a vertical line as the axis of symmetry based on the fact that the tilts of the first and second partial approximate curves coincide to a predetermined extent or more.

When it is determined that the tilt of the first partial approximate curve $LPA_{13}$ and the tilt of the second partial approximate curve $LPB_{13}$ coincide to a predetermined extent or more, the process proceeds to Step S19. On the other hand, when it is not determined that the tilt of the first partial approximate curve $LPA_{13}$ and the tilt of the second partial approximate curve $LPB_{13}$ coincide to a predetermined extent or more, the process proceeds to Step S20. In the example shown in FIG. 16, because the tilt of the first partial approximate curve $LPA_{13}$ and the tilt of the second partial approximate curve $LPB_{13}$ coincide to a predetermined extent or more, the process proceeds to Step S19.

In Step S19, the specifying unit 16 determines whether or not the degree of coincidence of the first partial approximate curve $LPA_{13}$ and the second partial approximate curve $LPB_{13}$ with the first partial contour $LOA_{13}$ and the second partial contour $LOB_{13}$, respectively, is equal to or more than a predetermined degree. The degree of coincidence of the partial approximate curve with the partial contour is obtained by calculating the consensus as described with reference to FIG. 11. Specifically, the ratio of the number of points on the corresponding partial approximate curve to all points on the partial contour is calculated as the consensus.

When it is determined that the degree of coincidence of the first and second partial approximate curves with the first and second partial contours, respectively, is equal to or more than a predetermined degree, the specifying unit 16 specifies that the shape of the neckline of clothing shown in the image is a V-neck. On the other hand, when it is not determined that the degree of coincidence of the first and second partial approximate curves with the first and second partial contours, respectively, is equal to or more than a predetermined degree, the specifying unit 16 specifies that the shape of the neckline of clothing shown in the image is an unknown shape and is not classifiable.

In the example shown in FIG. 16, because the degree of coincidence of the first partial approximate curve $LPA_{13}$ and the second partial approximate curve $LPB_{13}$ with the first partial contour $LOA_D$ and the second partial contour $LOB_{13}$, respectively, is equal to or more than a predetermined degree, the specifying unit 16 specifies that the shape of the neckline of clothing shown in FIG. 16 is a V-neck.

Figure 17:
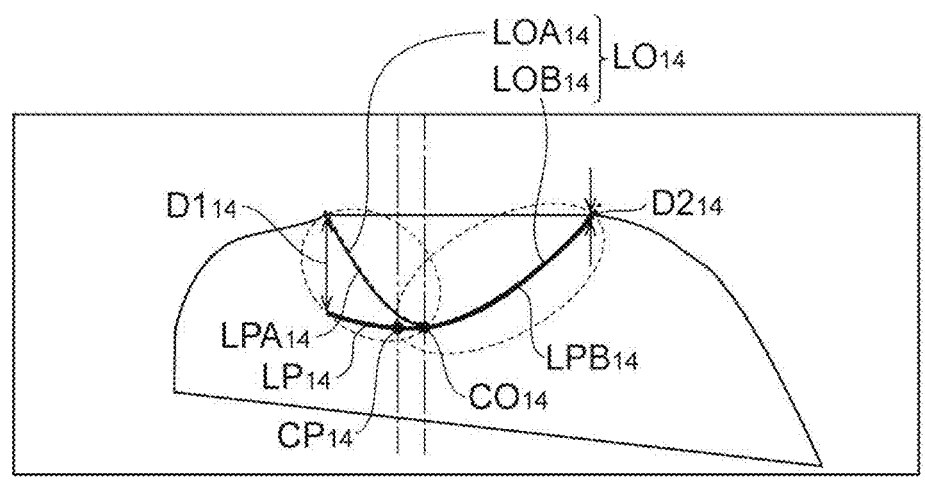
FIG. 17 is an example of a clothing image, which is a target of shape discrimination.

The process in the flowchart of FIG. 13 is described with reference to FIG. 17. FIG. 17 is a view showing an example in which the specifying unit 16 specifies that the shape of a part of an object is a second shape in the case where one of the first distance and the second distance is less than a predetermined value, the other one is equal to or more than a predetermined value, the center coincidence is less than a predetermined degree, and the tilt of the first partial approximate curve and the tilt of the second partial approximate curve coincide to a predetermined extent or more. In this embodiment, the specifying unit 16 specifies that the shape of the neckline of clothing shown in the image is a V-neck in such a case.

In the clothing image shown in FIG. 17, a contour $LO_{14}$, an approximate curve $LP_{14}$, and a first distance $D1_{14}$ and a second distance $D2_{14}$, which are distances from the first and second ends of the contour $LO_{14}$ to the corresponding first and second ends of the approximate curve $LP_{14}$, respectively, are shown. Further, a first partial contour $LOA_{14}$ and a second partial contour $LOB_{14}$, which are segments of the contour $LO_{14}$ divided at the deepest point, which is the point with the longest distance from a line connecting the first end and the second end of the contour $LO_{14}$ among the points on the contour $LO_{14}$, as the boundary are shown. Further, a first partial approximate curve $LPA_{14}$ and a second partial approximate curve $LPB_{14}$, which are the approximate curves of the first partial contour $LOA_{14}$ and the second partial contour $LOB_{14}$, respectively, are shown.

In Step S11, the specifying unit 16 determines whether or not the first distance $D1_{14}$ and the second distance $D2_{14}$ are both less than a predetermined value. In the example of FIG. 17, because the first distance $D1_{14}$ and the second distance $D2_{14}$ are both not less than a predetermined value, the process proceeds to Step S14.

In Step S14, the specifying unit 16 determines whether or not the first distance $D1_{14}$ and the second distance $D2_{14}$ are both equal to or more than a predetermined value. In the example of FIG. 17, because the first distance $D1_{14}$ is equal to or more than a predetermined value and the second distance $D2_{14}$ is less than a predetermined value, the process proceeds to Step S16.

In Step S16, the specifying unit 16 determines whether or not the center coincidence, which is the degree of coincidence between the center $CO_{14}$ of the contour $LO_{14}$ and the center $CP_{14}$ of the approximate curve $LP_{14}$, is equal to or more than a predetermined degree. In the example of FIG. 17, because the center $CO_{14}$ and the center $CP_{14}$ do not coincide, and therefore the center coincidence is not equal to or more than a predetermined degree, the process proceeds to Step S18.

In Step S18, the specifying unit 16 determines whether the tilt of the first partial approximate curve $LPA_{14}$ and the tilt of the second partial approximate curve $LPB_{14}$ coincide to a predetermined extent or more. In the example shown in FIG. 17, because the tilt of the first partial approximate curve $LPA_{14}$ and the tilt of the second partial approximate curve $LPB_{14}$ coincide to a predetermined extent or more, the process proceeds to Step S19.

In Step S19, the specifying unit 16 determines whether or not the degree of coincidence of the first partial approximate curve $LPA_{14}$ and the second partial approximate curve $LPB_{14}$ with the first partial contour $LOA_{14}$ and the second partial contour $LOB_{14}$, respectively, is equal to or more than a predetermined degree. In the example shown in FIG. 17, because the degree of coincidence of the first partial approximate curve $LPA_{14}$ and the second partial approximate curve $LPB_{14}$ with the first partial contour $LOA_{14}$ and the second partial contour $LOB_{14}$, respectively, is equal to or more than a predetermined degree, the specifying unit 16 specifies that the shape of the neckline of clothing shown in FIG. 17 is a V-neck.

Figure 18:
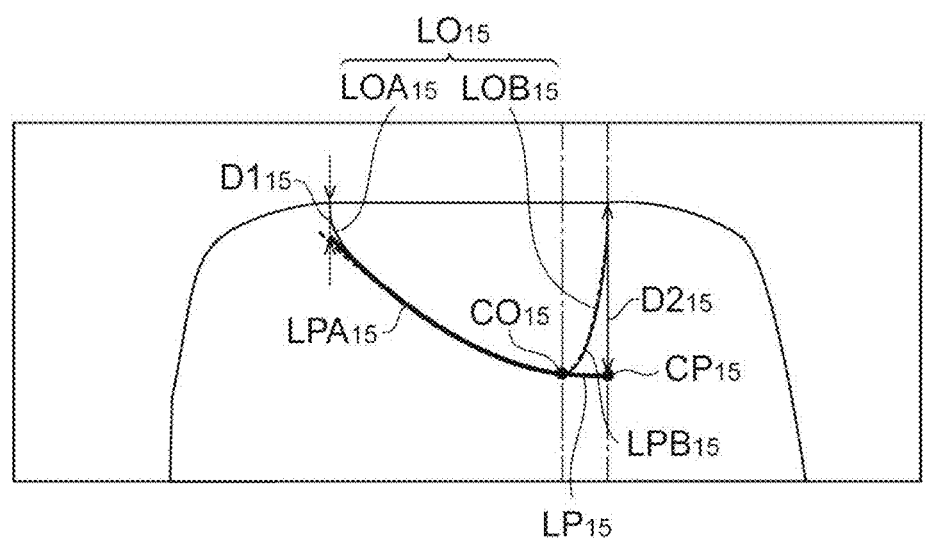
FIG. 18 is an example of a clothing image, which is a target of shape discrimination.

The process in the flowchart of FIG. 13 is described with reference to FIG. 18. FIG. 18 is a view showing an example in which the specifying unit 16 specifies that the shape of a part of an object is a third shape in the case where one of the first distance and the second distance is less than a predetermined value, the other one is equal to or more than a predetermined value, the center coincidence is less than a predetermined degree, and the tilt of the first partial approximate curve and the tilt of the second partial approximate curve do not coincide to a predetermined extent or more. In this embodiment, the specifying unit 16 specifies that the shape of the neckline of clothing shown in the image is an asymmetrical neck in such a case.

In the clothing image shown in FIG. 18, a contour $LO_{15}$, an approximate curve $LP_{15}$, and a first distance $D1_{15}$ and a second distance $D2_{15}$, which are distances from the first and second ends of the contour $LO_{15}$ to the corresponding first and second ends of the approximate curve $LP_{15}$, respectively, are shown. Further, a first partial contour $LOA_{15}$ and a second partial contour $LOB_{15}$, which are segments of the contour $LO_{15}$ divided at the deepest point, which is the point with the longest distance from a line connecting the first end and the second end of the contour $LO_{15}$ among the points on the contour $LO_{15}$, as the boundary are shown. Further, a first partial approximate curve $LPA_{15}$ and a second partial approximate curve $LPB_{15}$, which are the approximate curves of the first partial contour $LOA_{15}$ and the second partial contour $LOB_{15}$, respectively, are shown.

In Step S11, the specifying unit 16 determines whether or not the first distance $D1_{15}$ and the second distance $D2_{15}$ are both less than a predetermined value. In the example of FIG. 18, because the first distance $D1_{15}$ and the second distance $D2_{15}$ are both not less than a predetermined value, the process proceeds to Step S14.

In Step S14, the specifying unit 16 determines whether or not the first distance $D1_{15}$ and the second distance $D2_{15}$ are both equal to or more than a predetermined value. In the example of FIG. 18, because the first distance $D1_{15}$ is less than a predetermined value and the second distance $D2_{15}$ is equal to or more than a predetermined value, the process proceeds to Step S16.

In Step S16, the specifying unit 16 determines whether or not the center coincidence, which is the degree of coincidence between the center $CO_{15}$ of the contour $LO_{15}$ and the center $CP_{15}$ of the approximate curve $LP_{15}$, is equal to or more than a predetermined degree. In the example of FIG. 18, because the center $CO_{15}$ and the center $CP_{15}$ do not coincide, and therefore the center coincidence is not equal to or more than a predetermined degree, the process proceeds to Step S18.

In Step S18, the specifying unit 16 determines whether the tilt of the first partial approximate curve $LPA_{15}$ and the tilt of the second partial approximate curve $LPB_{15}$ coincide to a predetermined extent or more. In the example shown in FIG. 18, because the tilt of the first partial approximate curve $LPA_{15}$ and the tilt of the second partial approximate curve $LPB_{15}$ do not coincide to a predetermined extent or more, the process proceeds to Step S20.

In Step S20, the specifying unit 16 determines whether or not the degree of coincidence of the first partial approximate curve and the second partial approximate curve with the first partial contour and the second partial contour, respectively, is equal to or more than a predetermined degree. When it is determined that the degree of coincidence of the first and second partial approximate curves with the first and second partial contours, respectively, is equal to or more than a predetermined degree, the specifying unit 16 specifies that the shape of the neckline of clothing shown in the image is an asymmetrical neck. On the other hand, when it is not determined that the degree of coincidence of the first and second partial approximate curves with the first and second partial contours, respectively, is equal to or more than a predetermined degree, the specifying unit 16 specifies that the shape of the neckline of clothing shown in the image is an unknown shape and is not classifiable.

In the example shown in FIG. 18, because the degree of coincidence of the first partial approximate curve $LPA_{15}$ and the second partial approximate curve $LPB_{15}$ with the first partial contour $LOA_{15}$ and the second partial contour $LOB_{15}$, respectively, is equal to or more than a predetermined degree, the specifying unit 16 specifies that the shape of the neckline of clothing shown in FIG. 17 is an asymmetrical neck.

Figure 19:
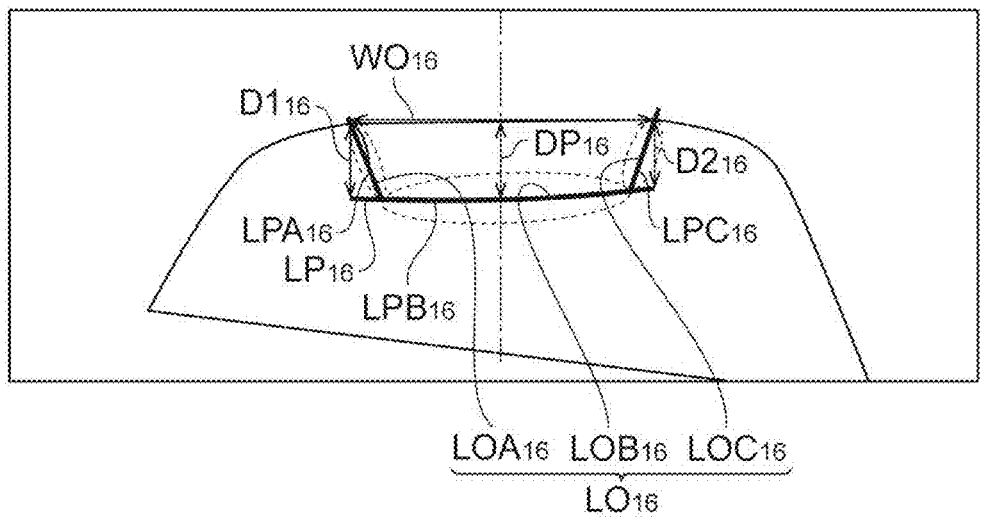
FIG. 19 is an example of a clothing image, which is a target of shape discrimination.

The process in the flowchart of FIG. 13 is described with reference to FIG. 19. FIG. 19 is a view showing an example in which the specifying unit 16 specifies that the shape of a part of an object is a fourth shape in the case where the first distance and the second distance are both equal to or more than a predetermined value, the aspect is equal to or more than a predetermined value, and the degree of coincidence of a third partial approximate curve, a fourth partial approximate curve and a fifth partial approximate curve with a third partial contour, a fourth partial contour and a fifth partial contour, respectively, is equal to or more than a predetermined degree. In this embodiment, the specifying unit 16 specifies that the shape of the neckline of clothing shown in the image is a square neck in such a case.

In the clothing image shown in FIG. 19, a contour $LO_{16}$, an approximate curve $LP_{16}$, and a first distance $D1_{16}$ and a second distance $D2_{16}$, which are distances from the first and second ends of the contour $LO_{16}$ to the corresponding first and second ends of the approximate curve $LP_{16}$, respectively, are shown. Further, an end-to-end distance $WO_{16}$, which is the distance between the first end and the second end of the contour $LO_{16}$, and a depth $DP_{12}$, which is the longest distance among the distances from a line connecting the first end and the second end of the contour $LO_{16}$ to points on the approximate curve $LP_{16}$, are shown.

In Step S11, the specifying unit 16 determines whether the first distance $D1_{16}$ and the second distance $D2_{16}$ are both less than a predetermined value or not. In the example of FIG. 19, because the first distance $D1_{16}$ and the second distance $D2_{16}$ are both not less than a predetermined value, the process proceeds to Step S14.

In Step S14, the specifying unit 16 determines whether or not the first distance $D1_{16}$ and the second distance $D2_{16}$ are both equal to or more than a predetermined value. In the example of FIG. 19, because the first distance $D1_{16}$ and the second distance $D2_{16}$ are both equal to or more than a predetermined value, the process proceeds to Step S15.

In Step S15, the specifying unit 16 determines whether or not an aspect, which is the ratio of the depth to the end-to-end distance, is less than a predetermined value. In the example of FIG. 19, because the aspect, which is calculated as the ratio of the depth $DP_{16}$ to the end-to-end distance $WO_{16}$, is equal to or more than a predetermined value, the process proceeds to Step S17.

In Step S17, the specifying unit 16 specifies whether or not the degree of coincidence of a third partial approximate curve $LPA_{16}$, a fourth partial approximate curve $LPB_{16}$ and a fifth partial approximate curve $LPC_{16}$ with a third partial contour $LOA_{16}$, a fourth partial contour $LOB_{16}$ and a fifth partial contour $LOC_{16}$, respectively, is equal to or more than a predetermined degree.

The approximate curve calculation unit 12 divides the contour $LO_{16}$ at two points on the contour $LO_{16}$ and thereby generates the third to fifth partial contours $LOA_{16}$, $LOB_{16}$ and $LOC_{16}$. The approximate curve calculation unit 12 sets a boundary point between a part of the contour $LO_{16}$ that coincides with the approximate curve $LP_{16}$ (a part where a consensus is established) and a part of the contour $LO_{16}$ that does not coincide with the approximate curve $LP_{16}$ as a dividing point for generating partial contours. Then, the approximate curve calculation unit 12 calculates the third partial approximate curve $LPA_{16}$, the fourth partial approximate curve $LPB_{16}$ and the fifth partial approximate curve $LPC_{16}$ that respectively approximate to the third partial contour $LOA_{16}$, the fourth partial contour $LOB_{16}$ and the fifth partial contour $LOC_{16}$. The calculation of the third partial approximate curve $LPA_{16}$ based on the third partial contour $LOA_{16}$, the calculation of the fourth partial approximate curve $LPB_{16}$ based on the fourth partial contour $LOB_{16}$, and the calculation of the fifth partial approximate curve $LPC_{16}$ based on the fifth partial contour $LOC_{16}$ are performed in the same manner as the calculation of the approximate curve $L_{P1}$ based on the contour $L_{O1}$ described with reference to FIG. 7.

The degree of coincidence of each partial approximate curve with each partial contour is obtained by calculating the consensus as described with reference to FIG. 11. Specifically, the ratio of the number of points on the corresponding partial approximate curve to all points on the partial contour is calculated as the consensus.

When it is determined that the degree of coincidence of the third partial approximate curve $LPA_{16}$, the fourth partial approximate curve $LPB_{16}$ and the fifth partial approximate curve $LPC_{16}$ with the third partial contour $LOA_{16}$, the fourth partial contour $LOB_{16}$ and the fifth partial contour $LOC_{16}$, respectively, is equal to or more than a predetermined degree, the specifying unit 16 specifies that the shape of the neckline of clothing shown in the image is a square neck. On the other hand, when it is not determined that the degree of coincidence of the third partial approximate curve $LPA_{16}$, the fourth partial approximate curve $LPB_{16}$ and the fifth partial approximate curve $LPC_{16}$ with the third partial contour $LOA_{16}$, the fourth partial contour $LOB_{16}$ and the fifth partial contour $LOC_{16}$, respectively, is equal to or more than a predetermined degree, the specifying unit 16 specifies that the shape of the neckline of clothing shown in the image is an unknown shape and is not classifiable.

As described above, in Step S17, because the third partial approximate curve, the fourth partial approximate curve and the fifth partial approximate curve are calculated, and the shape of a part of an object is specified based on the degree of coincidence with the corresponding partial contours, it is possible to appropriately estimate the shape of a part of an object which is characterized by the three partial approximate curves.

Note that, when it is determined in Step S11 that the first distance $D1_{16}$ and the second distance $D2_{16}$ are both not less than a predetermined value, and it is not determined in Step S14 that the first distance $D1_{16}$ and the second distance $D2_{16}$ are both equal to or more than a predetermined value, the process proceeds to Step S17 also when it is determined in Step S16 that the center coincidence is equal to or more than a predetermined degree. Then, when it is determined in Step S17 that the degree of coincidence of the third partial approximate curve $LPA_{16}$, the fourth partial approximate curve $LPB_{16}$ and the fifth partial approximate curve $LPC_{16}$ with the third partial contour $LOA_{16}$, the fourth partial contour $LOB_{16}$ and the fifth partial contour $LOC_{16}$, respectively, is equal to or more than a predetermined degree, the specifying unit 16 specifies that the shape of the neckline of clothing shown in the image is a square neck.

Note that the predetermined value, the predetermined degree and the predetermined extent to be compared with various values in each step of FIG. 13 are set appropriately by design for a target whose shape is to be determined. The predetermined value and the like may be set by learning using various calculation values of an image where the shape of a part of an object is determined.

The shape of the neckline may be specified by only the processing of some of Steps S11 to S20 shown in the flowchart of FIG. 13.

For example, the shape of the neckline may be specified as any one of a round neck, a V-neck and a square neck by performing only the processing of Steps S11 and S12. Specifically, in Step S11, the specifying unit 16 determines whether or not the first distance and the second distance are both less than a predetermined value. When it is not determined that the first distance and the second distance are both less than a predetermined value, the specifying unit 16 specifies that the shape of the neckline of clothing is a square neck. On the other hand, when it is determined that the first distance and the second distance are both less than a predetermined value, the process proceeds to Step S12. In Step S12, the specifying unit 16 determines whether or not the center coincidence is equal to or more than a specified degree. When it is determined that the center coincidence is equal to or more than a specified degree, the specifying unit 16 specifies that the shape of the neckline of clothing is a round neck. On the other hand, when it is not determined that the center coincidence is equal to or more than a specified degree, the specifying unit 16 specifies that the shape of the neckline of clothing is a V-neck.

Further, the shape of the neckline may be specified as any one of a round neck, a V-neck and a square neck by performing only the processing of Steps S11, S12, S14, S15 and S16. Specifically, in Step S11, the specifying unit 16 determines whether or not the first distance and the second distance are both less than a predetermined value. When it is determined that the first distance and the second distance are both less than a predetermined value, the process proceeds to Step S12. On the other hand, when it is not determined that the first distance and the second distance are both less than a predetermined value, the process proceeds to Step S14.

In Step S12, the specifying unit 16 determines whether or not the center coincidence is equal to or more than a specified degree. When it is determined that the center coincidence is equal to or more than a specified degree, the specifying unit 16 specifies that the shape of the neckline of clothing is a round neck. On the other hand, when it is not determined that the center coincidence is equal to or more than a specified degree, the specifying unit 16 specifies that the shape of the neckline of clothing is a V-neck.

When the process proceeds to Step S14 from Step S11, the specifying unit 16 determines whether or not the first distance and the second distance are both equal to or more than a predetermined value. When it is determined that the first distance and the second distance are both equal to or more than a predetermined value, the process proceeds to Step S15. On the other hand, when it is not determined that the first distance and the second distance are both equal to or more than a predetermined value, the process proceeds to Step S16.

When the process proceeds to Step S15 from Step S14, the specifying unit 16 determines whether or not the aspect, which is the ratio of the depth to the end-to-end distance, is less than a predetermined value. When it is determined that the aspect is less than a predetermined value, the specifying unit 16 specifies that the shape of the neckline of clothing is a round neck. On the other hand, when it is not determined that the aspect is less than a predetermined value, the specifying unit 16 specifies that the shape of the neckline of clothing is a square neck.

When the process proceeds to Step S16 from Step S14, the specifying unit 16 determines whether or not the center coincidence is equal to or more than a specified degree. When it is determined that the center coincidence is equal to or more than a specified degree, the specifying unit 16 specifies that the shape of the neckline of clothing is a square neck. On the other hand, when it is not determined that the center coincidence is equal to or more than a specified degree, the specifying unit 16 specifies that the shape of the neckline of clothing is a V-neck.

Figure 20:
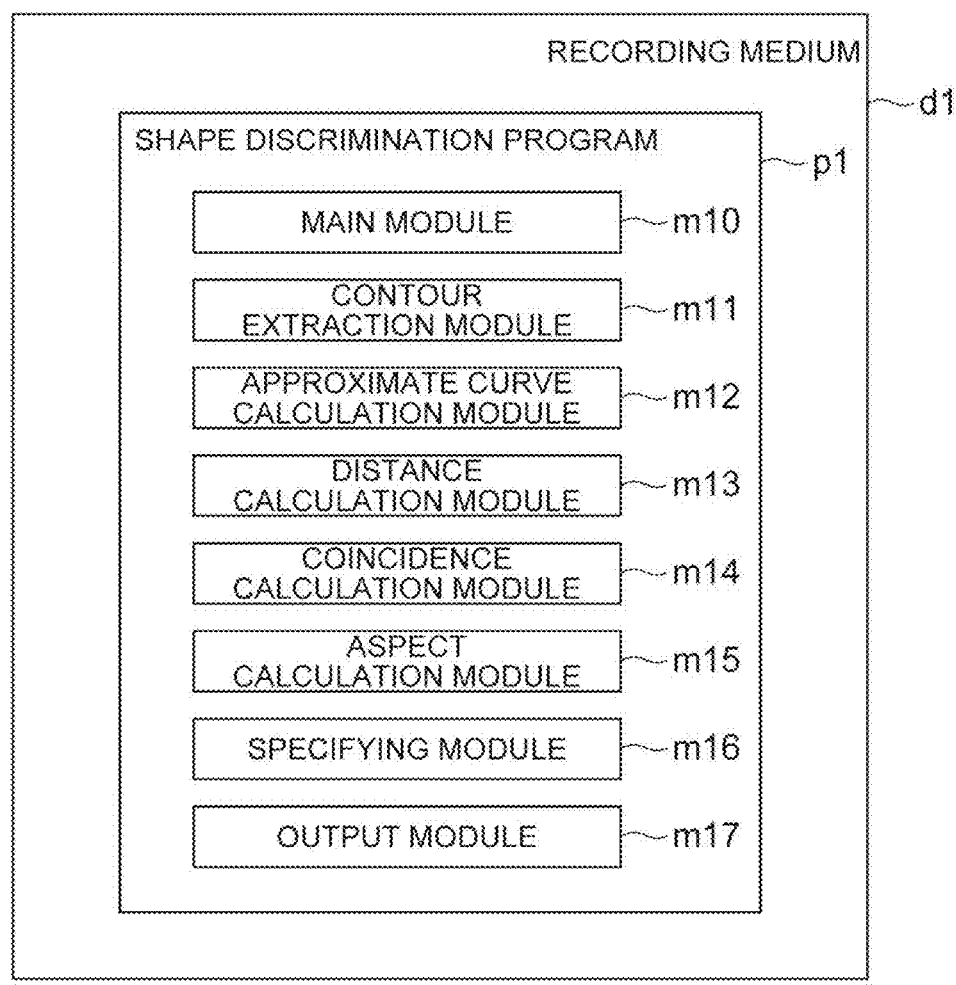
FIG. 20 is an example of a clothing image, which is a target of shape discrimination.

A shape discrimination program that causes a computer to function as the shape discrimination device 1 is described hereinafter with reference to FIG. 20. A shape discrimination program p1 includes a main module m10, a contour extraction module m11, an approximate curve calculation module m12, a distance calculation module m13, a coincidence calculation module m14, an aspect calculation module m15, a specifying module m16, and an output module m17.

The main module m10 is a part that exercises control over the shape discrimination process. The functions implemented by executing the contour extraction module m11, the approximate curve calculation module m12, the distance calculation module m13, the coincidence calculation module m14, the aspect calculation module m15, the specifying module m16 and the output module m17 are respectively equal to the functions of the contour extraction unit 11, the approximate curve calculation unit 12, the distance calculation unit 13, the coincidence calculation unit 14, the aspect calculation unit 15, the specifying unit 16 and the output unit 17 of the shape discrimination device 1 shown in FIG. 1.

The shape discrimination program p1 is provided by a storage medium d1 such as CD-ROM, DVD-ROM or semiconductor memory, for example. Further, the shape discrimination program p1 may be provided as a computer data signal superimposed onto a carrier wave through a communication network.

In the shape discrimination device 1, the shape discrimination method and the shape discrimination program p1 according to this embodiment described above, an approximate curve that approximates to a contour, which represents a part of the outline of an object shown in an image, is calculated, and first and second distances, which are distances between corresponding ends of the approximate curve and the contour, and a center coincidence, which is the degree of coincidence between the center of the contour and the approximate curve, are calculated. The characteristics of the shape of a part of an object are reflected on the first and second distances and the center coincidence. Because the shape of a part of the object is specified based on the first and second distances and the center coincidence, it is possible to appropriately estimate the shape of a part of the object.

An embodiment of the present invention is described in detail above. However, the present invention is not limited to the above-described embodiment. Various changes and modifications may be made to the present invention without departing from the scope of the invention.

Although a target of the specification and discrimination of a shape is the neckline of clothing in this embodiment, the target may be the shape of the lens of glasses, the shape of the upper part of a hat and the like, for example.

REFERENCE SIGNS LIST

1 . . . shape discrimination device, 3 . . . image storage unit, 10 . . . vertical direction, 11 . . . contour extraction unit, 12 . . . approximate curve calculation unit, 13 . . . distance calculation unit, 14 . . . coincidence calculation unit, 15 . . . aspect calculation unit, 16 . . . specifying unit, 17 . . . output unit, d1 . . . storage medium, p1 . . . shape discrimination program, m10 . . . main module, m11 . . . contour extraction module, m12 . . . approximate curve calculation module, m13 . . . distance calculation module, m14 . . . coincidence calculation module, m15 . . . aspect calculation module, m16 . . . specifying module, m17 . . . output module, p1 . . . shape discrimination program

The invention claimed is:

1. A shape discrimination device comprising:
at least one memory configured to store computer program code; and
at least one processor configured to access said at least one memory, read said computer program code and operate as instructed by said computer program code, said computer program code comprising:
approximate curve calculation code configured to cause at least one of said at least one processor to calculate an approximate curve of a contour, the contour being a line having a finite length representing a part of an outline of an object shown in an image and the contour being defined between a first end and a second end, the approximate curve being a line approximating to the contour and calculated based on coordinates forming the contour, the approximate curve being defined between a first end, corresponding to the first end of the contour, and a second end, corresponding to the second end of the contour;
distance calculation code configured to cause at least one of said at least one processor to calculate a first distance from the first end of the contour to the corresponding first end of the approximate curve, and calculate a second distance from the second end of the contour to the corresponding second end of the approximate curve;
coincidence calculation code configured to cause at least one of said at least one processor to calculate a center coincidence, indicating an extent of coincidence between a center of the contour and a center of the approximate curve;
specifying code configured to cause at least one of said at least one processor to specify a shape of the object or a part of the object based on the first distance, the second distance, and the center coincidence; and
output code configured to cause at least one of said at least one processor to output information regarding the shape of the object or the part of the object specified.

2. The shape discrimination device according to claim 1, further comprising:
aspect calculation code configured to cause at least one of said at least one processor to determine a depth indicated by a longest distance among distances from a line connecting the first end and the second end of the contour to points on the approximate curve, determine an end-to-end distance that is a distance between the first end and the second end of the contour, and calculate an aspect that is a ratio of the depth to the end-to-end distance, wherein
the specifying code is configured to causes at least one of said at least one processor to specify the shape of the object or the part of the object based on the first distance, the second distance, the center coincidence, and the aspect.

3. The shape discrimination device according to claim 1, wherein
the approximate curve calculation code is configured to cause at least one of said at least one processor to calculate a first partial approximate curve and a second partial approximate curve, respectively being approximate curves of a first partial contour and a second partial contour wherein the first partial contour and the second partial contour are segments of the contour obtained by dividing the contour at a deepest point of the contour, the deepest point being a point, among points on the contour, with a longest distance from a line connecting the first end and the second end of the contour, and
the specifying code is configured to cause at least one of said at least one processor to specify the shape of the object or the part of the object by further using tilts of the first partial approximate curve and the second partial approximate curve.

4. The shape discrimination device according to claim 1, wherein
the approximate curve calculation code is configured to cause at least one of said at least one processor to calculate a third partial approximate curve, a fourth partial approximate curve, and a fifth partial approximate curve, respectively being approximate curves of a third partial contour, a fourth partial contour, and a fifth partial contour, wherein the third partial contour, the fourth partial contour, and the fifth partial contour are segments of the contour obtained by dividing the contour at each of both ends of a part of the contour coinciding with the approximate curve to a predetermined extent or greater, and the specifying code is configured to cause at least one of said at least one processor to specify the shape of the object or the part of the object by further using an extent to which the third partial approximate curve, the fourth partial approximate curve, and the fifth partial approximate curve coincide with the third partial contour, the fourth partial contour and the fifth partial contour, respectively.

5. The shape discrimination device according to claim 1, wherein
the approximate curve calculation code is configured to cause at least one of said at least one processor to calculate a plurality of quadratic curves based on arbitrary three points on the contour and calculate, as the approximate curve, a quadratic curve with a highest extent of coincidence with the contour among the plurality of calculated quadratic curves.

6. The shape discrimination device according to claim 1, wherein
the shape of the part of the object is a shape of a neckline of clothing.

7. The shape discrimination device according to claim 1, wherein
the specifying code is configured to cause at least one of said at least one processor to specify that the shape of the object or the part of the object is a first shape when the first distance and the second distance are both less than a predetermined value and the center coincidence is equal to or greater than a predetermined extent.

8. The shape discrimination device according to claim 2, wherein
the specifying code is configured to cause at least one of said at least one processor to specify that the shape of the object or the part of the object is a first shape when the first distance and the second distance are both equal to or more than a predetermined value and the aspect is less than a predetermined value.

9. The shape discrimination device according to claim 3, wherein
the specifying code is configured to cause at least one of said at least one processor to specify that the shape of the object or the part of the object is a second shape when the first distance and the second distance are both less than a predetermined value, the center coincidence is less than a predetermined extent, and a tilt of the first partial approximate curve and a tilt of the second partial approximate curve coincide to a predetermined extent or greater, the specifying code is configured to cause at least one of said at least one processor to specify that the shape of the object or the part of the object is the second shape when one of the first distance and the second distance is less than a predetermined value, the other one is equal to or more than a predetermined value, the center coincidence is less than a predetermined extent, and the tilt of the first partial approximate curve and the tilt of the second partial approximate curve coincide to a predetermined extent or greater, and the specifying code is configured to cause at least one of said at least one processor to specify that the shape of the object or the part of the object is a third shape when one of the first distance and the second distance is less than a predetermined value, the other one is equal to or more than a predetermined value, the center coincidence is less than a predetermined extent, and the tilt of the first partial approximate curve and the tilt of the second partial approximate curve do not coincide to a predetermined extent or greater.

10. The shape discrimination device according to claim 4, wherein
the specifying code is configured to cause at least one of said at least one processor to specify that the shape of the object or the part of the object is a fourth shape in at least one of the following cases:
when one of the first distance and the second distance is less than a predetermined value, the other one is equal to or more than a predetermined value, the center coincidence is equal to or greater than a predetermined extent, and an extent of coincidence of the third partial approximate curve, the fourth partial approximate curve and the fifth partial approximate curve with the third partial contour, the fourth partial contour and the fifth partial contour, respectively, is equal to or greater than a predetermined extent, or
when the first distance and the second distance are both equal to or greater than a predetermined value, an aspect is equal to or more than a predetermined value, the aspect being a ratio of a depth to an end-to-end distance, the depth being indicated by a longest distance among distances from a line connecting the first end and the second end of the contour to points on the approximate curve, and the end-to-end distance being a distance between the first end and the second end of the contour, and an extent of coincidence of the third partial approximate curve, the fourth partial approximate curve and the fifth partial approximate curve with the third partial contour, the fourth partial contour and the fifth partial contour, respectively, is equal to or greater than a predetermined extent.

11. A shape discrimination method in a shape discrimination device, comprising:
calculating an approximate curve of a contour, the contour being a line having a finite length representing a part of an outline of an object shown in an image and the contour being defined between a first end and a second end, the approximate curve being a line approximating to the contour and calculated based on coordinates forming the contour, the approximate curve being defined between a first end, corresponding to the first end of the contour, and a second end, corresponding to the second end of the contour;
calculating a first distance from the first end of the contour to the corresponding first end of the approximate curve, and calculating a second distance from the second end of the contour to the corresponding second end of the approximate curve;
calculating a center coincidence indicating an extent of coincidence between a center of the contour and a center of the approximate curve;
specifying a shape of the object or a part of the object based on the first distance, the second distance, and the center coincidence; and
outputting information regarding the shape of the object or the part of the object specified.

* * * * *